(12) United States Patent
Shimizu

(10) Patent No.: US 12,516,921 B2
(45) Date of Patent: Jan. 6, 2026

(54) LASER INTERFEROMETER

(71) Applicant: SEIKO EPSON CORPORATION, Tokyo (JP)

(72) Inventor: Takeshi Shimizu, Chino (JP)

(73) Assignee: SEIKO EPSON CORPORATION (JP)

( * ) Notice: Subject to any disclaimer, the term of this patent is extended or adjusted under 35 U.S.C. 154(b) by 768 days.

(21) Appl. No.: 17/953,978

(22) Filed: Sep. 27, 2022

(65) Prior Publication Data

US 2023/0095129 A1  Mar. 30, 2023

(30) Foreign Application Priority Data

Sep. 28, 2021 (JP) ................. 2021-157609

(51) Int. Cl.
*G01B 9/02* (2022.01)
*G01B 9/02001* (2022.01)

(52) U.S. Cl.
CPC ....... *G01B 9/0201* (2013.01); *G01B 9/02045* (2013.01); *G01B 9/02083* (2013.01)

(58) Field of Classification Search
CPC .............. G01B 9/0201; G01B 9/02045; G01B 9/02083; G01B 9/02084
See application file for complete search history.

(56) References Cited

U.S. PATENT DOCUMENTS

2022/0065614 A1* 3/2022 Yamada ................. G01P 3/366

FOREIGN PATENT DOCUMENTS

| JP | H07-151772 A | 6/1995 |
|---|---|---|
| JP | 2007-285898 A | 11/2007 |
| JP | 2010-107738 A | 5/2010 |
| JP | 5618526 B2 | 11/2014 |
| JP | 5777899 B2 | 9/2015 |
| JP | 5806006 B2 | 11/2015 |

* cited by examiner

*Primary Examiner* — Hwa Andrew Lee
(74) *Attorney, Agent, or Firm* — Harness, Dickey & Pierce, P.L.C.

(57) ABSTRACT

A laser interferometer includes a laser light source configured to emit first laser light; an optical modulator that includes a resonator element and is configured to generate second laser light including a modulation signal; a light receiving element configured to receive the second laser light and third laser light including a sample signal; and a calculation unit configured to calculate a displacement of an object to be measured from a light reception signal based on a reference signal, in which the calculation unit includes a preprocessing unit configured to execute a preprocessing of extracting a frequency modulation component from the light reception signal and output a preprocessing signal, a demodulation processing unit configured to mix the preprocessing signal with orthogonal signals to obtain a mixed signal and then execute a demodulation processing of extracting the sample signal from the mixed signal, and an orthogonal signal generation unit configured to generate the orthogonal signals based on a phase of the reference signal and an amplitude of the preprocessing signal.

18 Claims, 10 Drawing Sheets

LASER INTERFEROMETER

The present application is based on, and claims priority from JP Application Serial Number 2021-157609, filed Sep. 28, 2021, the disclosure of which is hereby incorporated by reference herein in its entirety.

BACKGROUND

1. Technical Field

The present disclosure relates to a laser interferometer.

2. Related Art

JP-A-07-151772 (Patent Literature 1) is an example of the related art. Patent Literature 1 discloses an optical Doppler speedometer that measures a speed of an object to be measured using a Doppler effect that occurs in a reflected light beam from the object to be measured when the object to be measured is irradiated with a light beam from a light source.

Specifically, in the optical Doppler speedometer disclosed in Patent Literature 1, first, a measurement light beam is obtained by irradiating the object to be measured with a light source light beam emitted from the light source, and a reference light beam is obtained by modulating the light source light beam using an optical modulator. A phase modulation signal is supplied to the optical modulator. The optical modulator modulates a phase of the light source light beam according to the phase modulation signal.

Next, synthetic light including the measurement light beam and the reference light beam is detected by a photodetector, and a light detection signal having a frequency modulation component corresponding to the phase modulation signal is obtained. Next, the obtained light detection signal is AM demodulated according to two pilot signals, and then is FM demodulated. As a result, a speed of the object to be measured is calculated.

In such an optical Doppler speedometer, the phase modulation signal and the two pilot signals are synchronized with a sine wave signal output from a quartz crystal oscillator. Accordingly, the phase modulation signal and the light detection signal obtained from the photodetector can be aligned in phase. As a result, a distortion component included in a demodulated signal after the FM demodulation can be reduced to be small, and speed measurement can be performed with high accuracy.

In the optical Doppler speedometer disclosed in Patent Literature 1, a quartz crystal oscillator is used as a source of a reference signal. The quartz crystal oscillator includes a quartz crystal resonator and a circuit that drives the quartz crystal resonator. Examples of a circuit that drives the quartz crystal oscillator include an oscillation circuit provided with an inverter. Since such an oscillation circuit has a relatively simple circuit configuration, there is an advantage in that it is easy to reduce a size. On the other hand, when the oscillation circuit is used, a phase of a voltage signal extracted from the oscillation circuit depends on a capacitance of a capacitor provided in the oscillation circuit, a parasitic capacitance of the circuit, and the like. Since the capacitance of the capacitor, the parasitic capacitance of the circuit, and the like change in accordance with the environment such as surrounding temperature, the phase of the voltage signal extracted from the oscillation circuit also changes. In this case, a phase of the sine wave signal serving as a reference for synchronizing the phase modulation signal and the two pilot signals described above also changes. As a result, there are problems in that it is difficult to accurately align the phase of the light detection signal and the phase of the phase modulation signal, and measurement accuracy of the speed of the object to be measured is reduced.

SUMMARY

A laser interferometer according to an application example of the present disclosure includes:
- a laser light source configured to emit first laser light;
- an optical modulator that includes a resonator element and is configured to modulate the first laser light using the resonator element and generate second laser light including a modulation signal;
- a light receiving element configured to receive the second laser light and third laser light including a sample signal generated by an object to be measured reflecting the first laser light and output a light reception signal; and
- a calculation unit configured to calculate a displacement of the object to be measured from the light reception signal based on a reference signal, in which the calculation unit includes
- a preprocessing unit configured to execute a preprocessing of extracting a frequency modulation component from the light reception signal and output a preprocessing signal,
- a demodulation processing unit configured to mix the preprocessing signal with orthogonal signals to obtain a mixed signal and then execute a demodulation processing of extracting the sample signal from the mixed signal, and
- an orthogonal signal generation unit configured to generate the orthogonal signals based on a phase of the reference signal and an amplitude of the preprocessing signal, or based on the phase of the reference signal and an amplitude of the mixed signal.

DESCRIPTION OF EXEMPLARY EMBODIMENTS

Hereinafter, a laser interferometer according to an aspect of the present disclosure will be described in detail based on embodiments shown in the accompanying drawings.

1. First Embodiment

First, a laser interferometer according to a first embodiment will be described.

Figure 1:
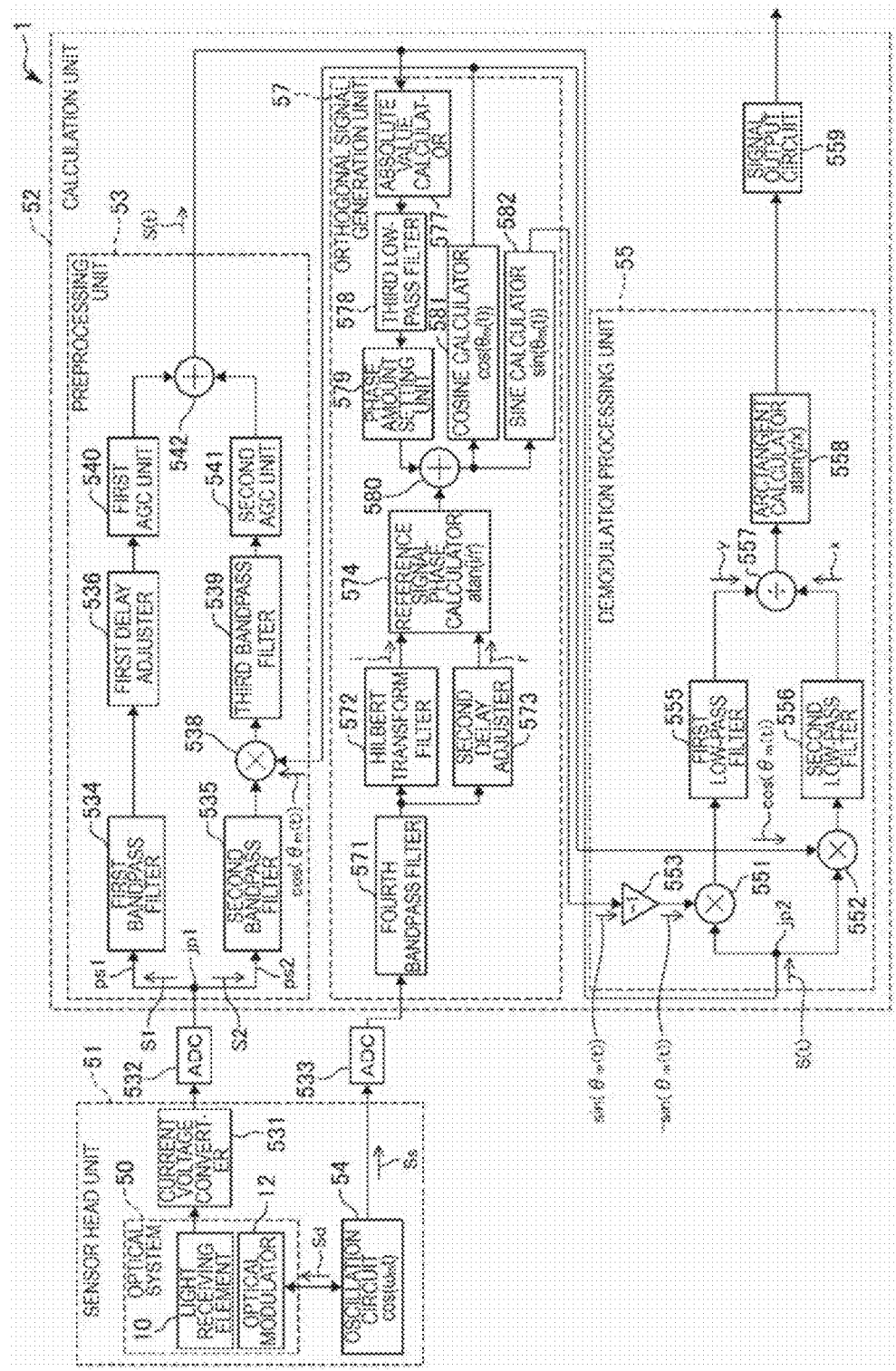
FIG. 1 is a functional block diagram showing a laser interferometer according to a first embodiment.

FIG. 1 is a functional block diagram showing the laser interferometer according to the first embodiment.

The laser interferometer 1 shown in FIG. 1 includes a sensor head unit 51 and a calculation unit 52 to which a light detection signal from an optical system 50 is input. The sensor head unit 51 includes the optical system 50, a current voltage converter 531, and an oscillation circuit 54.

1.1. Sensor Head Unit

Figure 2:
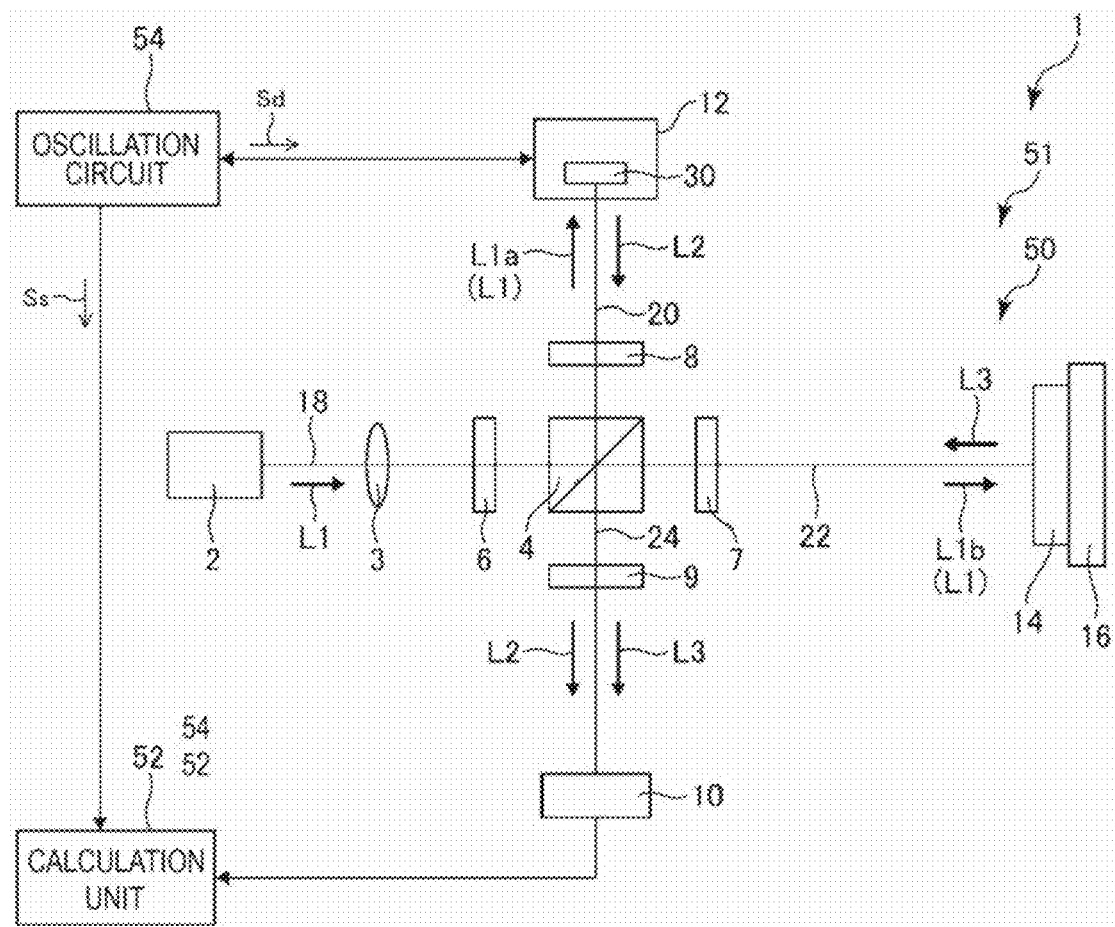
FIG. 2 is a schematic configuration diagram showing a sensor head unit shown in FIG. 1.

FIG. 2 is a schematic configuration diagram showing the sensor head unit 51 shown in FIG. 1.

1.1.1. Optical System

As described above, the sensor head unit 51 includes the optical system 50.

As shown in FIG. 2, the optical system 50 includes a laser light source 2, a collimator lens 3, a light splitter 4, a half-wavelength plate 6, a quarter-wavelength plate 7, a quarter-wavelength plate 8, an analyzer 9, a light receiving element 10, an optical modulator 12 of a frequency shifter type, and a setting unit 16 in which an object to be measured 14 is disposed.

The laser light source 2 emits emitted light L1 (first laser light). The light receiving element 10 is a photodetector to convert received light into an electric signal. The optical modulator 12 includes a resonator element 30, and changes a frequency of the emitted light L1 to generate reference light L2 (second laser light) including a modulation signal. The setting unit 16 may be provided as needed, and the object to be measured 14 can be disposed in the setting unit 16. The emitted light L1 incident on the object to be measured 14 is reflected as object light L3 (third laser light) including a sample signal which is a Doppler signal derived from the object to be measured 14.

An optical path of the emitted light L1 emitted from the laser light source 2 is referred to as an optical path 18. On the optical path 18, the collimator lens 3 and the half-wavelength plate 6 are arranged in this order from a laser light source 2 side. The optical path 18 is connected to an optical path 20 by light reflected by the light splitter 4. On the optical path 20, the quarter-wavelength plate 8 and the optical modulator 12 are arranged in this order from a light splitter 4 side. The optical path 18 is connected to an optical path 22 by light transmitted through the light splitter 4. On the optical path 22, the quarter-wavelength plate 7 and the setting unit 16 are arranged in this order from a light splitter 4 side.

The optical path 20 is connected to an optical path 24 by light transmitted through the light splitter 4. On the optical path 24, the analyzer 9 and the light receiving element 10 are arranged in this order from a light splitter 4 side.

The emitted light L1 emitted from the laser light source 2 is split into two light beams by the light splitter 4, and one of the two light beams is incident on the optical modulator 12 through the optical path 20. The other one of the two light beams is incident on the object to be measured 14 through the optical path 22. The reference light L2 generated by the optical modulator 12 is incident on the light receiving element 10 through the optical path 20 and the optical path 24. The object light L3 generated by light reflected by the object to be measured 14 is incident on the light receiving element 10 through the optical path 22 and the optical path 24.

An "optical path" in the present specification indicates a path that is provided between optical components and through which light travels.

Hereinafter, each unit of the optical system 50 will be further described.

1.1.1.1. Laser Light Source

The laser light source 2 is a laser light source that emits the emitted light L1 having coherence. A light source having a line width of a band of MHz or less may be used as the laser light source 2. Specific examples of the laser light source 2 include a gas laser such as a He—Ne laser, and a semiconductor laser element such as a distributed feedback-laser diode (DFB-LD), a fiber bragg grating laser diode (FBG-LD), a vertical cavity surface emitting laser (VCSEL) diode, and a Fabry-Perot laser diode (FP-LD).

In particular, the laser light source 2 is preferably a semiconductor laser element. Accordingly, it is possible to reduce a size of the laser light source 2 in particular. Therefore, it is possible to reduce a size of the laser interferometer 1. In particular, in the laser interferometer 1, since a size and a weight of the sensor head unit 51 in which the optical system 50 is accommodated are reduced, it is also useful in that operability of the laser interferometer 1 is improved.

1.1.1.2. Collimator Lens

The collimator lens 3 is a convex lens disposed between the laser light source 2 and the light splitter 4. The collimator lens 3 collimates the emitted light L1 emitted from the laser light source 2.

In a case where the emitted light L1 emitted from the laser light source 2 is sufficiently collimated, for example, when a gas laser such as a He—Ne laser is used as the laser light source 2, the collimator lens 3 may be omitted.

On the other hand, when the laser light source 2 is a semiconductor laser element, the laser interferometer 1 preferably includes the collimator lens 3 disposed between the laser light source 2 and the light splitter 4. Accordingly, the emitted light L1 emitted from the semiconductor laser element can be collimated. As a result, since the emitted light L1 becomes collimated light, it is possible to prevent an increase in sizes of various optical components that receive the emitted light L1, and it is possible to reduce the size of the laser interferometer 1.

When the emitted light L1 that became collimated light passes through the half-wavelength plate 6, the emitted light L1 is converted into linearly polarized light having an intensity ratio of P-polarized light to S-polarized light of, for example, 50:50, and is incident on the light splitter 4.

1.1.1.3. Light Splitter

The light splitter 4 is a polarization beam splitter that is disposed between the laser light source 2 and the optical modulator 12 and is disposed between the laser light source 2 and the object to be measured 14. The light splitter 4 has a function of transmitting P-polarized light and reflecting S-polarized light. With such a function, the light splitter 4 splits the emitted light L1 into first split light L1a that is light reflected by the light splitter 4 and second split light L1b that is light transmitted through the light splitter 4.

The first split light L1a that is S-polarized light reflected by the light splitter 4 is converted into circularly polarized light by the quarter-wavelength plate 8, and is incident on the optical modulator 12. The circularly polarized light of the first split light L1a that is incident on the optical modulator 12 is subjected to a frequency shift of $f_m$ [Hz] and is reflected as the reference light L2. Therefore, the reference light L2 includes a modulation signal of a frequency $f_m$ [Hz]. The reference light L2 is converted into P-polarized light again when the reference light L2 passes through the quarter-wavelength plate 8. The P-polarized light of the reference light L2 passes through the light splitter 4 and the analyzer 9 and is incident on the light receiving element 10.

The second split light L1b that is P-polarized light transmitted through the light splitter 4 is converted into circularly polarized light by the quarter-wavelength plate 7 and is incident on the object to be measured 14 in a moving state. The circularly polarized light of the second split light L1b incident on the object to be measured 14 is subjected to a Doppler shift of $f_d$ [Hz] and is reflected as the object light L3. Therefore, the object light L3 includes a sample signal of a frequency $f_d$ [Hz]. The object light L3 is converted into S-polarized light again when the object light L3 passes through the quarter-wavelength plate 7. The S-polarized light of the object light L3 is reflected by the light splitter 4, passes through the analyzer 9, and is incident on the light receiving element 10.

As described above, since the emitted light L1 has coherence, the reference light L2 and the object light L3 are incident on the light receiving element 10 as interference light.

A non-polarization beam splitter may be used instead of the polarization beam splitter. In this case, since the half-wavelength plate 6, the quarter-wavelength plate 7, the quarter-wavelength plate 8, and the like are not necessary, it is possible to reduce the size of the laser interferometer 1 by reducing the number of components. In addition, a light splitter other than the beam splitter may be used.

1.1.1.4. Analyzer

Since the S-polarized light and the P-polarized light orthogonal to each other are independent of each other, a beat due to interference does not appear by simply superimposing the S-polarized light and the P-polarized light. Therefore, light waves obtained by superimposing the S-polarized light and the P-polarized light pass through the analyzer 9 in a manner of being inclined by 45° relative to both the S-polarized light and the P-polarized light. Since the analyzer 9 is used, light components common to each other can be transmitted and interference can be caused. As a result, the analyzer 9 causes the reference light L2 and the object light L3 to interfere with each other, and generates interference light having a frequency of $|f_m - f_d|$ [Hz].

1.1.1.5. Light Receiving Element

When the interference light is incident on the light receiving element 10, the light receiving element 10 outputs a light reception signal. A sample signal is demodulated from the light reception signal using a method to be described later, so that a movement of the object to be measured 14, that is, a vibration speed and a displacement can be finally obtained. Examples of the light receiving element 10 include a photodiode. The light receiving element 10 receives the interference light and outputs a photocurrent.

1.1.1.6. Optical Modulator

Figure 3:
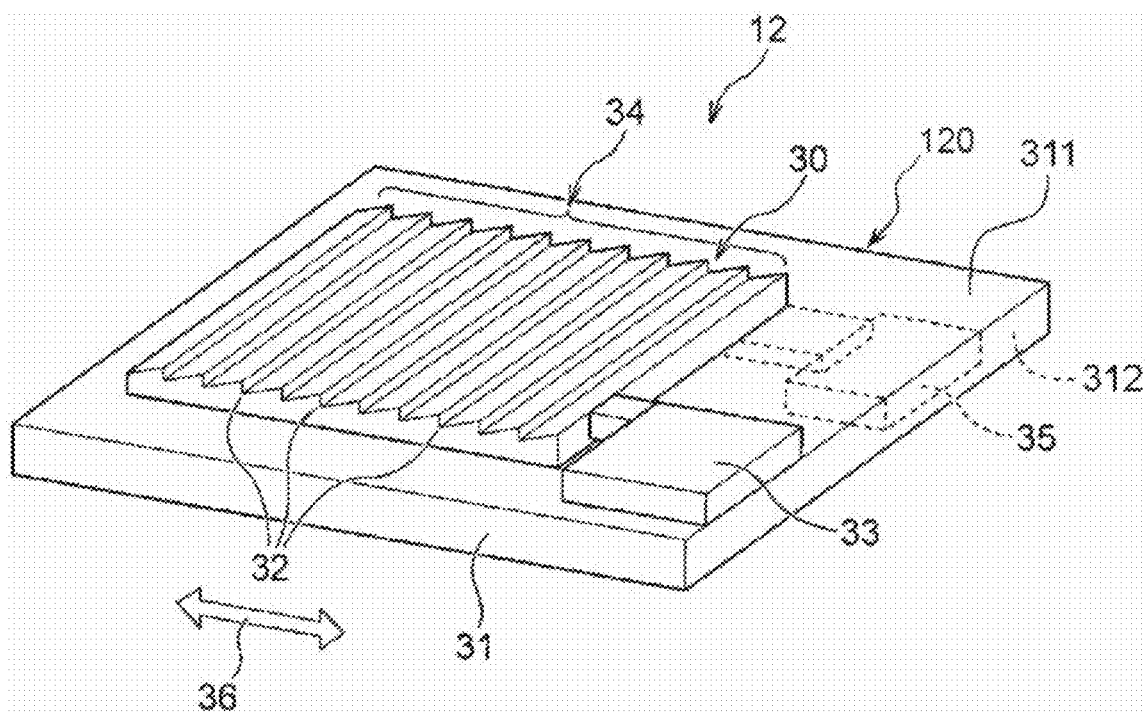
FIG. 3 is a perspective view showing a first configuration example of an optical modulator shown in FIG. 2.

FIG. 3 is a perspective view showing a first configuration example of the optical modulator 12 shown in FIG. 2.

1.1.1.6.1. Overview of First Configuration Example of Optical Modulator

The optical modulator 12 of a frequency shifter type includes an optical modulation resonator 120. The optical modulation resonator 120 shown in FIG. 3 includes a plate-shaped resonator element 30 and a substrate 31 that supports the resonator element 30.

The resonator element 30 is made of a material that repeats a mode in which the resonator element 30 vibrates so as to be distorted in a direction along a surface by applying a potential. In the present configuration example, the resonator element 30 is a quartz crystal AT resonator that performs a thickness shear vibration along a vibration direction 36 in a high frequency region of an MHz band. A diffraction grating 34 is formed on a front surface of the resonator element 30. The diffraction grating 34 has a plurality of grooves 32 having a component intersecting the vibration direction 36, that is, a plurality of linear grooves 32 extending in a direction intersecting the vibration direction 36.

The substrate 31 has a front surface 311 and a back surface 312 that have a front and back relationship relative to each other. The resonator element 30 is disposed on the front surface 311. A pad 33 for applying a potential to the resonator element 30 is provided on the front surface 311. In addition, a pad 35 for applying a potential to the resonator element 30 is provided on the back surface 312.

A long side of the substrate 31 is, for example, about 0.5 mm or more and 10.0 mm or less. A thickness of the substrate 31 is, for example, about 0.10 mm or more and 2.0 mm or less. For example, a shape of the substrate 31 is a square having a side of 1.6 mm and a thickness of 0.35 mm.

A long side of the resonator element 30 is, for example, about 0.2 mm or more and 3.0 mm or less. A thickness of the resonator element 30 is, for example, about 0.003 mm or more and 0.5 mm or less.

For example, a shape of the resonator element 30 is a square having a side of 1.0 mm and a thickness of 0.07 mm. In this case, the resonator element 30 oscillates at a basic oscillation frequency of 24 MHz. The oscillation frequency can be adjusted in a range of 1 MHz to 1 GHz by changing a thickness of the resonator element 30 or considering an overtone.

Although the diffraction grating 34 is formed on the entire front surface of the resonator element 30 in FIG. 3, the diffraction grating 34 may be formed only on a part of the front surface of the resonator element 30.

A magnitude of an optical modulation performed by the optical modulator 12 is determined by an inner product of a vector of the resonator element 30 in the vibration direction 36 and a difference wavenumber vector between a wavenumber vector of the emitted light L1 that is incident on the optical modulator 12 and a wavenumber vector of the reference light L2 emitted from the optical modulator 12. Although the resonator element 30 performs a thickness shear vibration in the present configuration example, since this vibration is an in-plane vibration, even when light is incident perpendicularly to the front surface of the resonator element 30 alone, an optical modulation cannot be performed. Therefore, the diffraction grating 34 is provided on the resonator element 30 in the present configuration example, so that an optical modulation can be performed by a principle to be described later.

The diffraction grating 34 shown in FIG. 3 is a blazed diffraction grating. The blazed diffraction grating refers to a diffraction grating having a stepwise cross sectional shape. The linear grooves 32 of the diffraction grating 34 are provided such that an extending direction of the linear grooves 32 is orthogonal to the vibration direction 36.

When a drive signal Sd is supplied (an AC voltage is applied) from the oscillation circuit 54 shown in FIGS. 1 and 2 to the resonator element 30 shown in FIG. 3, the resonator element 30 oscillates. Power (drive power) required for the oscillation of the resonator element 30 is not particularly limited, and is as small as about 0.1 µW to 100 mW. Therefore, the drive signal Sd output from the oscillation circuit 54 can be used to cause the resonator element 30 to oscillate without amplifying the drive signal Sd.

Since an optical modulator in the related art may require a structure for maintaining a temperature of the optical modulator, it is difficult to reduce a volume of the optical modulator. In addition, an optical modulator in the related art has a problem in that it is difficult to reduce a size and power consumption of a laser interferometer because of large power consumption. In contrast, since a volume of the resonator element 30 is fairly small and power required for the oscillation of the resonator element 30 is small, a size and power consumption of the laser interferometer 1 can be easily reduced in the present configuration example.

1.1.1.6.2. Method of Forming Diffraction Grating

A method of forming the diffraction grating 34 is not particularly limited, and examples of the method include a method in which a mold is formed using a mechanical wire type (a routing engine) method, and the grooves 32 are formed on an electrode film-formed on the front surface of the resonator element 30 of a quartz crystal AT resonator using a nanoimprinting method. Here, a reason why the grooves 32 are formed on the electrode is that a high-quality thickness shear vibration can be caused on the electrode in principle in the case of a quartz crystal AT resonator. The grooves 32 are not limited to being formed on the electrode, and may be formed on a front surface of a material of a non-electrode portion. In addition, instead of the nanoimprinting method, a processing method by exposure and etching, an electron beam lithography method, a focused ion beam (FIB) processing method, or the like may be used.

The diffraction grating may be formed of a resist material on a chip of a quartz crystal AT resonator, and a metal film or a mirror film formed of a dielectric multilayer film may be provided on the diffraction grating. Reflectance of the diffraction grating 34 can be increased by providing the metal film or the mirror film.

Further, a resist film may be formed on a chip or a wafer of a quartz crystal AT resonator, processed by etching, then the resist film is removed, and thereafter a metal film or a mirror film may be formed on a surface to be processed. In this case, since the resist material is removed, an influence of moisture absorption or the like of the resist material can be eliminated, and chemical stability of the diffraction grating 34 can be improved. Further, a metal film having high conductivity such as Au or Al is provided, so that the metal film can also be used as an electrode for driving the resonator element 30.

The diffraction grating 34 may be formed using a technique such as anodized alumina (porous alumina).

1.1.1.6.3. Other Configuration Example of Optical Modulator

The resonator element 30 is not limited to a quartz crystal resonator, and may be, for example, a Si resonator, a surface acoustic wave (SAW) device, and a ceramic resonator.

Figure 4:
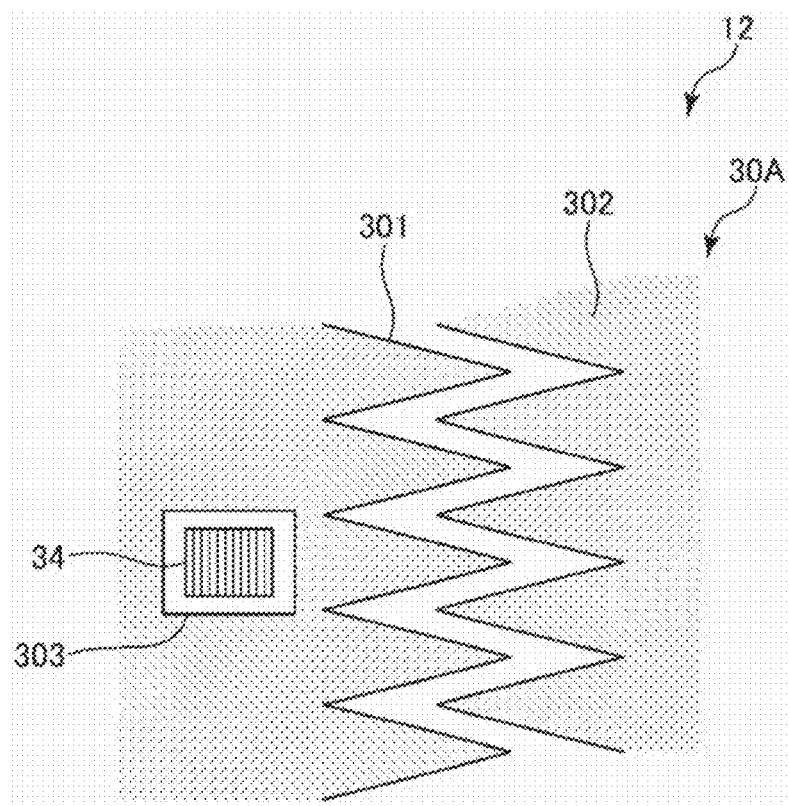
FIG. 4 is a plan view showing a part of a second configuration example of the optical modulator.
Figure 5:
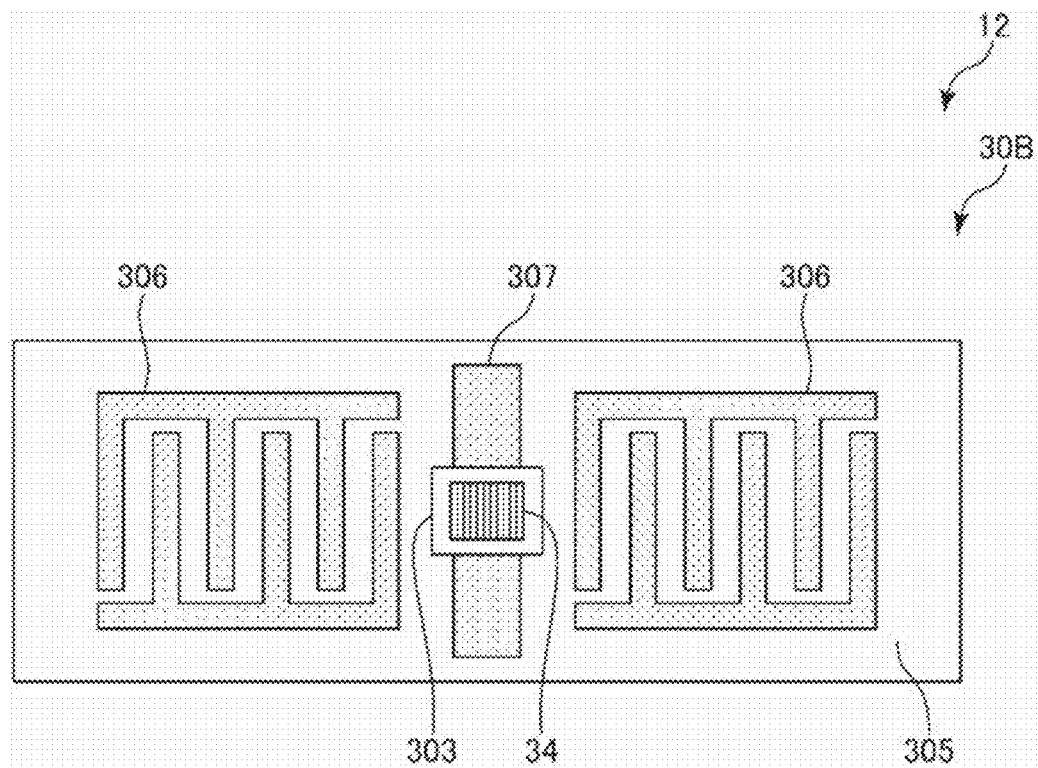
FIG. 5 is a plan view showing a third configuration example of the optical modulator.

FIG. 4 is a plan view showing a part of a second configuration example of the optical modulator 12. FIG. 5 is a plan view showing a third configuration example of the optical modulator 12.

A resonator element 30A shown in FIG. 4 is a Si resonator manufactured from a Si substrate using an MEMS technique. The MEMS refers to a micro electro mechanical system.

The resonator element 30A includes a first electrode 301 and a second electrode 302 that are adjacent to each other on the same plane with a gap between the first electrode 301 and the second electrode 302, a diffraction grating mounting portion 303 provided on the first electrode 301, and the diffraction grating 34 provided on the diffraction grating mounting portion 303. For example, the first electrode 301 and the second electrode 302 vibrate using electrostatic attraction as a drive force so as to repeatedly come close to and separate from each other in a left-right direction in FIG. 4, that is, along an axis that connects the first electrode 301 and the second electrode 302 shown in FIG. 4. Accordingly, an in-plane vibration can be applied to the diffraction grating 34. An oscillation frequency of the Si resonator is, for example, about 1 kHz to several hundreds of MHz.

A resonator element 30B shown in FIG. 5 is an SAW device using surface waves. The SAW refers to surface acoustic waves.

The resonator element 30B includes a piezoelectric substrate 305, a comb-shaped electrode 306 provided on the piezoelectric substrate 305, a ground electrode 307, the diffraction grating mounting portion 303, and the diffraction grating 34. When an AC voltage is applied to the comb-shaped electrode 306, surface acoustic waves are excited by an inverse piezoelectric effect. Accordingly, an in-plane vibration can be applied to the diffraction grating 34. An oscillation frequency of the SAW device is, for example, about several hundreds of MHz to several GHz.

In the device described above, it is also possible to perform an optical modulation by a principle to be described later by providing the diffraction grating 34 in a similar manner to the case of a quartz crystal AT resonator.

On the other hand, when the resonator element 30 is a quartz crystal resonator, a highly accurate modulation signal can be generated using an extremely high Q value of the quartz crystal. The Q value is an index indicating sharpness of a resonance peak. In addition, the quartz crystal resonator has a feature that the quartz crystal resonator is less likely to be affected by disturbance. Therefore, a sample signal derived from the object to be measured 14 can be acquired with high accuracy by using a modulation signal modulated by the optical modulator 12 including a quartz crystal resonator.

1.1.1.6.4. Optical Modulation by Resonator Element

Next, a principle of modulating light using the resonator element 30 will be described.

Figure 6:
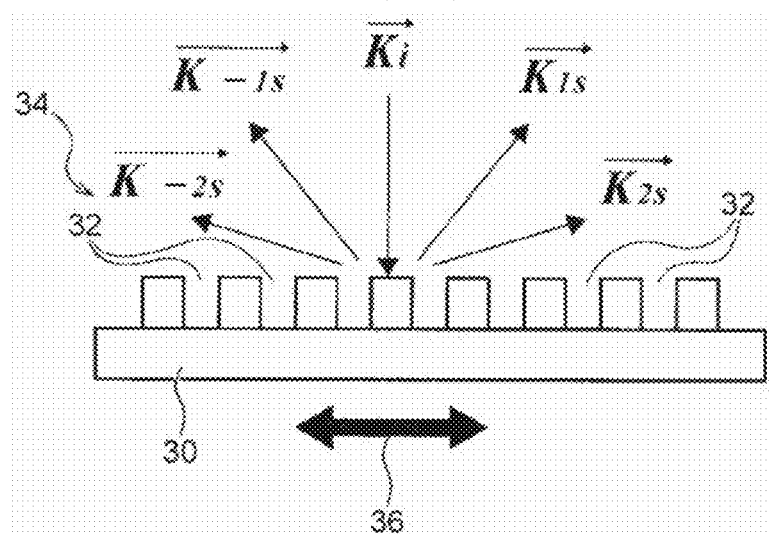
FIG. 6 is a conceptual diagram showing that a plurality of diffracted light beams are generated when incident light $K_i$ is incident from a direction perpendicular to a front surface of a resonator element.

FIG. 6 is a conceptual diagram showing that a plurality of diffracted light beams are generated when incident light $K_i$ is incident from a direction perpendicular to the front surface of the resonator element 30.

As shown in FIG. 6, when the incident light $K_i$ is incident on the diffraction grating 34 that performs a thickness shear vibration along the vibration direction 36, a plurality of diffracted light beams $K_{ns}$ are generated due to a diffraction phenomenon. n is an order of the diffracted light $K_{ns}$, and n=0, ±1, ±2, and the like. The diffraction grating 34 shown in FIG. 6 does not show the blazed diffraction grating shown in FIG. 3 but shows a diffraction grating formed by repeating irregularities as an example of another diffraction grating. Illustration of a diffracted light beam $K_{0s}$ is omitted in FIG. 6.

Although the incident light $K_i$ is incident from a direction perpendicular to the front surface of the resonator element 30 in FIG. 6, an incident angle of the incident light $K_i$ is not particularly limited. Alternatively, the incident angle may be set such that the incident light $K_i$ is obliquely incident on the front surface of the resonator element 30. When the incident light $K_{ns}$ is obliquely incident, a traveling direction of the diffracted light $K_{ns}$ also changes accordingly.

Depending on a design of the diffraction grating 34, high-order light of |n|≥2 may not appear. Therefore, it is desirable to set |n|=1 in order to stably obtain a modulation signal. That is, in the laser interferometer 1 shown in FIG. 2, the optical modulator 12 of a frequency shifter type may be disposed such that ±1 diffracted light beams are used as the reference light L2. With such an arrangement, measurement by the laser interferometer 1 can be stabilized.

On the other hand, when high-order light of |n|≥2 appears from the diffraction grating 34, the optical modulator 12 may be disposed such that any diffracted light beam of ±2 or higher is used as the reference light L2 instead of the ±1 diffracted light beams. As a result, high-order diffracted light can be used, so that the laser interferometer 1 can be made higher in frequency and smaller in size.

In the present embodiment, for example, the optical modulator 12 is configured such that an angle formed by an entering direction of the incident light $K_i$ that is incident on the optical modulator 12 and a traveling direction of the reference light L2 emitted from the optical modulator 12 is 180°. Hereinafter, three examples will be described with reference to FIGS. 7 to 9.

Figure 7:
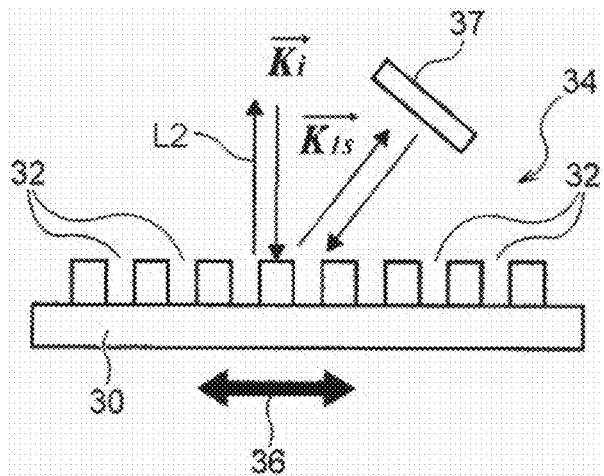
FIG. 7 is a conceptual diagram showing the optical modulator configured such that an angle formed by a traveling direction of the incident light $K_i$ and a traveling direction of reference light L2 is 180°.
Figure 8:
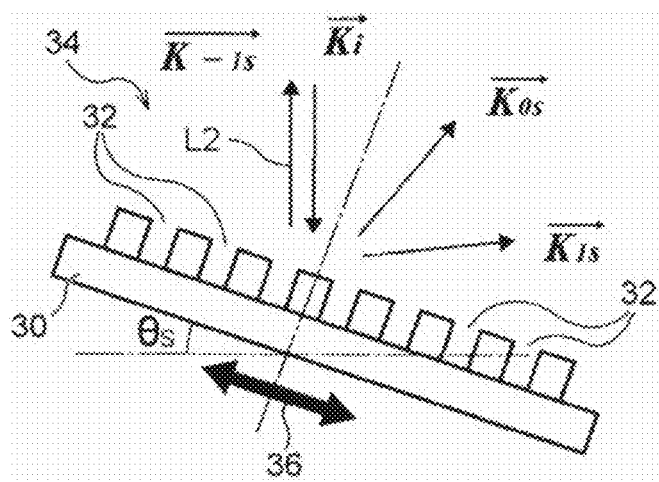
FIG. 8 is a conceptual diagram showing the optical modulator configured such that the angle formed by the traveling direction of the incident light $K_i$ and the traveling direction of the reference light L2 is 180°.
Figure 9:
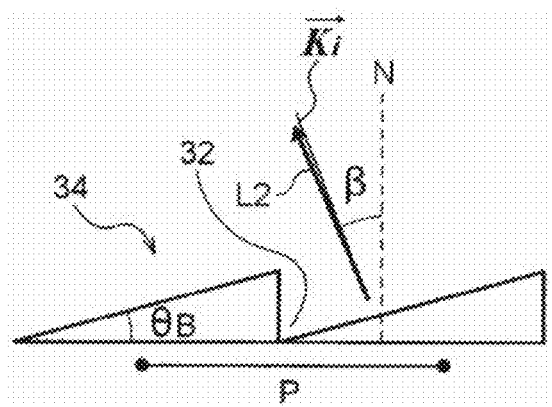
FIG. 9 is a conceptual diagram showing the optical modulator configured such that the angle formed by the traveling direction of the incident light $K_i$ and the traveling direction of the reference light L2 is 180°.

FIGS. 7 to 9 are conceptual diagrams showing the optical modulator 12 configured such that an angle formed by a traveling direction of the incident light $K_i$ and the traveling direction of the reference light L2 is 180°.

The optical modulator 12 shown in FIG. 7 includes a mirror 37 in addition to the resonator element 30. The mirror 37 is disposed in a manner of reflecting a diffracted light $K_{1s}$ and returning the diffracted light $K_{1s}$ to the diffraction grating 34. At this time, an angle formed by an incident angle of the diffracted light $K_{1s}$ relative to the mirror 37 and a reflection angle of the diffracted $K_{1s}$ reflected by the mirror 37 is 180°. As a result, the diffracted light $K_{1s}$ emitted from the mirror 37 and returned to the diffraction grating 34 is diffracted again by the diffraction grating 34 and travels in a direction opposite to the traveling direction of the incident light $K_i$ that is incident on the optical modulator 12. Therefore, it is possible to satisfy the above-described condition that the angle formed by the entering direction of the incident light $K_i$ and the traveling direction of the reference light L2 is 180° by providing the mirror 37.

Since the diffracted light $K_{1s}$ is reflected by the mirror 37 in this manner, the reference light L2 generated by the optical modulator 12 is subjected to a frequency modulation twice. Therefore, it is possible to perform a frequency modulation at a higher frequency by using the mirror 37 in combination as compared with a case of using the resonator element 30 alone.

In FIG. 8, the resonator element 30 is inclined as compared with an arrangement in FIG. 6. An inclination angle θs at this time is set so as to satisfy the above-described condition that an angle formed by the entering direction of the incident light $K_i$ and the traveling direction of the reference light L2 is 180°.

The diffraction grating 34 shown in FIG. 9 is a blazed diffraction grating having a blaze angle $\theta_B$. When the incident light $K_i$ traveling at an incident angle β relative to a normal line N of the front surface of the resonator element 30 is incident on the diffraction grating 34, the reference light L2 returns at the same angle as the blaze angle $\theta_B$ relative to the normal line N. Therefore, it is possible to satisfy the above-described condition that an angle formed by the entering direction of the incident light $K_i$ and the traveling direction of the reference light L2 is 180° by setting the incident angle β equal to the blaze angle $\theta_B$. In this case, since the above-described condition can be satisfied without using the mirror 37 shown in FIG. 7 and without inclining the resonator element 30 as shown in FIG. 8, it is possible to further reduce the size of the laser interferometer 1 and increase a frequency of the laser interferometer 1. In particular, in a case of a blazed diffraction grating, an arrangement satisfying the above condition is referred to as a "Littrow arrangement", and there is an advantage in that a diffraction efficiency of diffracted light can be particularly increased.

A pitch P in FIG. 9 represents a pitch of a blazed diffraction grating, and for example, the pitch P is 1 μm. The blaze angle $\theta_B$ is, for example, 25°. In this case, the incident angle β relative to the normal line N of the incident light $K_i$ may also be set to 25° in order to satisfy the above-described condition.

1.1.1.6.5. Package Structure

Figure 10:
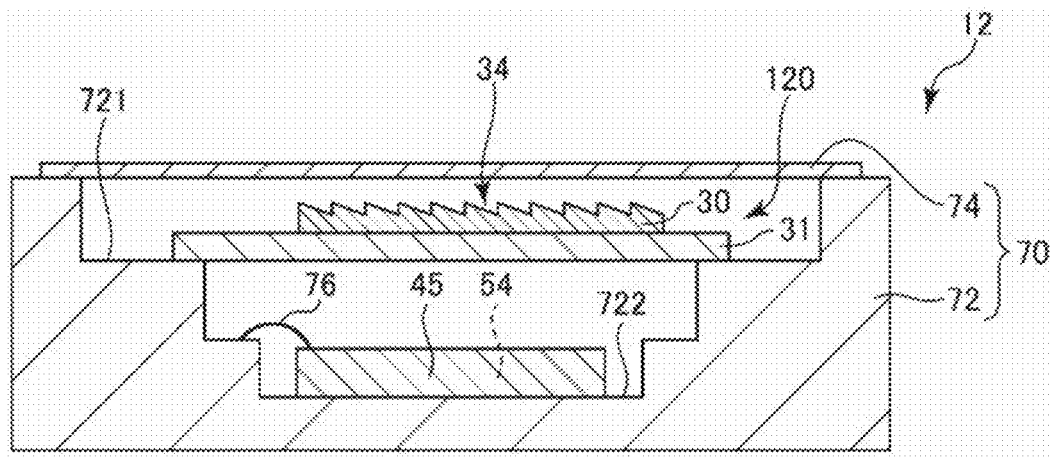
FIG. 10 is a cross sectional view showing the optical modulator having a package structure.

FIG. 10 is a cross sectional view showing the optical modulator 12 having a package structure.

The optical modulator 12 shown in FIG. 10 includes a container 70 serving as a housing, the optical modulation resonator 120 accommodated in the container 70, and a circuit element 45 forming the oscillation circuit 54. The container 70 is hermetically sealed in, for example, a depressurized atmosphere such as vacuum or an inert gas atmosphere such as nitrogen or argon.

As shown in FIG. 10, the container 70 includes a container body 72 and a lid 74. The container body 72 includes a first recessed portion 721 provided inside the container body 72 and a second recessed portion 722 that is provided inside the first recessed portion 721 and that is deeper than the first recessed portion 721. The container body 72 is formed of a ceramic material, a resin material, or the like. Although not shown, the container body 72 includes an internal terminal provided on an inner surface, an external terminal provided on an outer surface, a wire that couples the internal terminal and the external terminal, and the like.

An opening of the container body 72 is closed by the lid 74 via a sealing member such as a seal ring or low melting point glass (not shown). Examples of constituent materials of the lid 74 include a material capable of transmitting laser light such as a glass material.

The optical modulation resonator 120 is disposed on a bottom surface of the first recessed portion 721. The optical modulation resonator 120 is supported on the bottom surface of the first recessed portion 721 by a bonding member (not shown). The internal terminal of the container body 72 and the optical modulation resonator 120 are electrically coupled to each other via a conductive material (not shown) such as a bonding wire or a bonding metal.

The circuit element 45 is disposed on a bottom surface of the second recessed portion 722. The circuit element 45 is electrically coupled to the internal terminal of the container body 72 via a bonding wire 76. Accordingly, the optical modulation resonator 120 and the circuit element 45 are also electrically coupled to each other via a wire provided in the container body 72. The circuit element 45 may be provided in a circuit other than the oscillation circuit 54 to be described later.

By adopting such a package structure, since the optical modulation resonator 120 and the circuit element 45 can overlap with each other, a physical distance between the optical modulation vibrator 120 and the circuit element 45 can be reduced, and a wire length between the optical modulation resonator 120 and the circuit element 45 can be shortened. Therefore, it is possible to prevent a noise from entering the drive signal Sd from the outside, or conversely, it is possible to prevent the drive signal Sd from becoming a noise source. In addition, both the optical modulation resonator 120 and the circuit element 45 can be protected from the external environment by one container 70. Therefore, it is possible to improve reliability of the laser interferometer 1 while reducing the size of the sensor head unit 51.

A structure of the container 70 is not limited to the structure show in the drawings, and, for example, the optical modulation resonator 120 and the circuit element 45 may have separate package structures. Although not shown, other circuit elements provided in the oscillation circuit 54 may be accommodated in the container 70. The container 70 may be provided as needed, and may be omitted.

1.1.2. Current Voltage Converter

The current voltage converter 531 is also called a transimpedance amplifier (TIA), and converts a photocurrent (a light reception signal) output from the light receiving element 10 into a voltage signal and outputs the voltage signal as a light detection signal.

The optical system 50 may include a plurality of light receiving elements 10. In this case, it is possible to perform a differential amplification processing on the photocurrent and increase a signal-to-noise ratio (an S/N ratio) of a light detection signal, by providing a differential amplifier circuit between the plurality of light receiving elements 10 and the current voltage converter 531. The differential amplification processing may be performed on the voltage signal.

An ADC 532 shown in FIG. 1 is provided between the current voltage converter 531 and the calculation unit 52. The ADC 532 is an analog-to-digital converter, and converts an analog signal into a digital signal with a predetermined number of sampling bits.

1.1.3. Oscillation Circuit

As shown in FIG. 1, the oscillation circuit 54 outputs the drive signal Sd to be input to the optical modulator 12 of the optical system 50. The oscillation circuit 54 outputs a reference signal Ss to be input to the calculation unit 52.

Figure 11:
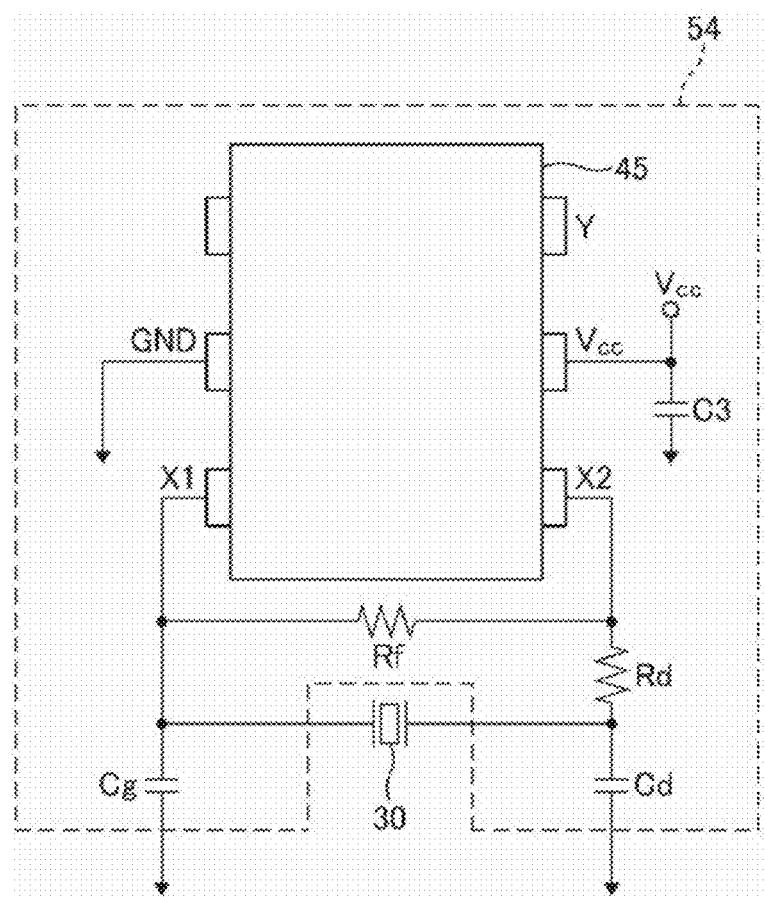
FIG. 11 is a circuit diagram showing a configuration of a single-stage inverter oscillation circuit.

The oscillation circuit 54 is not particularly limited as long as the oscillation circuit 54 is a circuit capable of oscillating the resonator element 30, and circuits having various configurations can be used as the oscillation circuit 54. FIG. 11 is a circuit diagram showing a configuration of a one-stage inverter oscillation circuit as an example of a circuit configuration.

The oscillation circuit 54 shown in FIG. 11 includes the circuit element 45, a feedback resistor Rf, a limiting resistor Rd, a first capacitor Cg, a second capacitor Cd, and a third capacitor C3.

The circuit element 45 is an inverter IC. A terminal X1 and a terminal X2 of the circuit element 45 are terminals coupled to an inverter inside the circuit element 45. A terminal GND is coupled to a ground potential, and a terminal Vcc is coupled to a power supply potential. A terminal Y is a terminal for oscillation output.

The first capacitor Cg is coupled between the terminal X1 and the ground potential. The limiting resistor Rd and the second capacitor Cd that are coupled in series to each other are coupled between the terminal X2 and the ground potential in this order from a terminal X2 side. One end of the feedback resistor Rf is coupled between the terminal X1 and the first capacitor Cg, and the other end of the feedback resistor Rf is coupled between the terminal X2 and the limiting resistor Rd.

One end of the resonator element 30 is coupled between the first capacitor Cg and the feedback resistor Rf, and the other end of the resonator element 30 is coupled between the second capacitor Cd and the limiting resistor Rd. Accordingly, the resonator element 30 serves as a signal source of the oscillation circuit 54.

Figure 12:
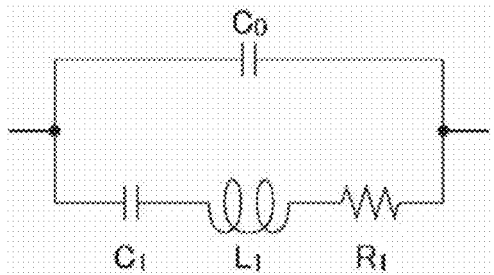
FIG. 12 is an example of an LCR equivalent circuit of the resonator element.

FIG. 12 is an example of an LCR equivalent circuit of the resonator element 30.

As shown in FIG. 12, the LCR equivalent circuit of the resonator element 30 includes a series capacitance $C_1$, a series inductance $L_1$, an equivalent series resistance $R_1$, and a parallel capacitance $C_0$.

In the oscillation circuit 54 shown in FIG. 11, a load capacitance $C_L$ is calculated by the following Formula (a), in which a capacitance of the first capacitor Cg is defined as $C_g$ and a capacitance of the second capacitor Cd is defined as $C_d$.

$$c_L = \frac{c_d c_g}{c_d + c_g} \quad (a)$$

Then, an oscillation frequency $f_{osc}$ output from the terminal Y of the oscillation circuit 54 is calculated by the following Formula (b).

$$f_{osc} = f_Q \sqrt{1 + \frac{C_1}{C_0 + C_L}} \quad (b)$$

$f_Q$ is a natural frequency of the resonator element 30.

According to the Formula (b), it can be seen that the oscillation frequency $f_{osc}$ of a signal output from the terminal Y can be finely adjusted by appropriately changing the load capacitance $C_L$.

A difference Δf between the natural frequency $f_Q$ of the resonator element 30 and the oscillation frequency $f_{osc}$ of the oscillation circuit 54 is calculated by the following Formula (c).

$$\Delta f = f_{osc} - f_Q = f_Q \left( \sqrt{1 + \frac{C_1}{C_0 + C_L}} - 1 \right) \quad (c)$$

Here, since $C_1 \ll C_0$, and $C_1 \ll C_L$, Δf can be substantially calculated by the following Formula (d).

$$\Delta f = f_{osc} - f_Q \cong \frac{C_1}{2(C_0 + C_L)} f_Q \quad (d)$$

Therefore, the oscillation frequency $f_{osc}$ of the oscillation circuit 54 has a value corresponding to the natural frequency $f_Q$ of the resonator element 30.

Here, for example, when the resonator element 30 is fixed to the container 70, the natural frequency $f_Q$ fluctuates when the resonator element 30 receives an expansion stress caused by temperature via a fixing portion. In addition, when the resonator element 30 is inclined, the natural frequency $f_Q$ fluctuates under an influence of gravity or the like due to an own weight of the resonator element 30.

In the oscillation circuit 54, when the natural frequency $f_Q$ fluctuates for such a reason, the oscillation frequency $f_{osc}$ changes in conjunction with the fluctuation based on the above-described Formula (d). That is, the oscillation frequency $f_{osc}$ constantly has a value shifted from the natural frequency $f_Q$ by Δf. Accordingly, the vibration of the resonator element 30 is stabilized, and a displacement amplitude is stabilized. Since a modulation feature of the optical modulator 12 is stabilized by stabilizing the displacement amplitude, demodulation accuracy of a sample signal in the calculation unit 52 can be improved.

For example, it is preferable that $\Delta f = |f_{osc} - f_Q| \geq 3000$ [Hz], and more preferable that $\Delta f = |f_{osc} - f_Q| \leq 600$ [Hz].

As described above, in the laser interferometer 1 according to the present embodiment, the optical modulator 12 includes the resonator element 30, and the optical modulator 12 modulates the first split light L1a using the resonator element 30.

According to such a configuration, a size and a weight of the optical modulator 12 can be reduced. As a result, a size and a weight of the laser interferometer 1 can be reduced.

The laser interferometer 1 includes the calculation unit 52 and the oscillation circuit 54. The oscillation circuit 54 uses the resonator element 30 as a signal source and outputs the reference signal Ss to the calculation unit 52 as shown in FIG. 1. The calculation unit 52 demodulates a sample signal that is derived from the object to be measured 14 from the light detection signal based on the reference signal Ss.

According to such a configuration, even when the natural frequency $f_Q$ of the resonator element 30 fluctuates, the oscillation frequency $f_{osc}$ of the oscillation circuit 54 can be changed to a value corresponding to the natural frequency $f_Q$ of the resonator element 30, so that the vibration of the resonator element 30 can be easily stabilized. Accordingly, a temperature feature of a modulation signal can be made to correspond to a temperature feature of the resonator element 30, and a modulation feature of the optical modulator 12 can be stabilized. As a result, demodulation accuracy of the sample signal in the calculation unit 52 can be improved.

In the above-described configuration, a temperature feature of the reference signal Ss output from the oscillation circuit 54 to the calculation unit 52 can also be made to correspond to the temperature feature of the resonator element 30. In this case, since both the temperature feature of a modulation signal and the temperature feature of a reference signal correspond to the temperature feature of the resonator element 30, a behavior of a fluctuation of the modulation signal and a behavior of a fluctuation of the reference signal Ss accompanying with a temperature change coincide with or are similar to each other. Therefore, even when a temperature of the resonator element 30 changes, demodulation accuracy can be prevented from being affected, and demodulation accuracy of a sample signal derived from the object to be measured 14 can be improved.

Further, since power consumption of the oscillation circuit 54 is low, power saving of the laser interferometer 1 can be easily achieved.

As described above, the resonator element 30 is preferably a quartz crystal resonator. Accordingly, a highly accurate modulation signal can be generated using an extremely high Q value of the quartz crystal. As a result, a sample signal derived from the object to be measured 14 can be acquired with high accuracy.

For example, a signal generator such as a function generator or a signal generator may be used instead of the oscillation circuit 54.

1.2. Calculation Unit

The calculation unit 52 executes a demodulation processing of demodulating a sample signal that is derived from the object to be measured 14 from a light detection signal output from the current voltage converter 531. The sample signal includes, for example, phase information and frequency information. A displacement of the object to be measured 14 can be acquired from the phase information, and a speed of the object to be measured 14 can be acquired from the frequency information. When different physical quantities can be acquired in this manner, the laser interferometer 1 can have functions of a displacement meter and a speedometer, so that it is possible to improve functionality of the laser interferometer 1.

A circuit configuration of the calculation unit 52 is set in accordance with a method of a modulation processing. In the laser interferometer 1 according to the present embodiment, the optical modulator 12 including the resonator element 30 is used. Since the resonator element 30 is an element that vibrates in a simple manner, a vibration speed changes every moment in a cycle. Therefore, a modulation frequency also changes with time, and a demodulation circuit in the related art cannot be used.

The demodulation circuit in the related art refers to, for example, a circuit that demodulates a sample signal from a light detection signal including a modulation signal modulated using an acousto-optic modulator (AOM). In the acousto-optic modulator, a modulation frequency does not change. Therefore, the demodulation circuit in the related art can demodulate a sample signal from a light detection signal including a modulation signal in which a modulation frequency does not change, but cannot demodulate a sample signal including a modulation signal modulated by the optical modulator 12 in which a modulation frequency changes.

Therefore, the calculation unit 52 shown in FIG. 1 includes a preprocessing unit 53, a demodulation processing unit 55, and an orthogonal signal generation unit 57. A light detection signal output from the current voltage converter 531, first, passes through the preprocessing unit 53, and then is guided to the demodulation processing unit 55. The preprocessing unit 53 executes a preprocessing on the light detection signal. When the preprocessing is executed, a processing of extracting a frequency modulation component from a light reception signal is performed, and a signal that can be demodulated by the demodulation circuit in the related art is obtained. Therefore, the demodulation processing unit 55 demodulates a sample signal derived from the object to be measured 14 using a known demodulation method. The orthogonal signal generation unit 57 generates a cosine wave signal cos ($\theta_m(t)$) and a sine wave signal sin ($\theta_m(t)$) that are orthogonal signals based on the reference signal Ss output from the oscillation circuit 54 and the preprocessing signal S(t) output from the preprocessing unit 53.

The above-described functions of the calculation unit 52 are implemented by, for example, hardware including a processor, a memory, an external interface, an input unit, a display unit, and the like. These components can communicate with one another via an internal bus.

Examples of the processor include a field-programmable gate array (FPGA), a central processing unit (CPU), and a digital signal processor (DSP).

Examples of the memory include a hard disk drive (HDD), a solid state drive (SSD), an electrically erasable programmable read-only memory (EEPROM), a read-only memory (ROM), and a random access memory (RAM).

Examples of the external interface include a digital input/output port such as a universal serial bus (USB) and an Ethernet (registered trademark) port.

Examples of the input unit include various input devices such as a keyboard, a mouse, a touch panel, and a touch pad. Examples of the display unit include a liquid quartz crystal display panel and an organic electro luminescence (EL) display panel.

1.2.1. Configuration of Preprocessing Unit

The preprocessing unit 53 shown in FIG. 1 includes a first bandpass filter 534, a second bandpass filter 535, a first delay adjuster 536, a multiplier 538, a third bandpass filter 539, a first AGC unit 540, a second AGC unit 541, and an adder 542. The AGC refers to auto gain control.

A light detection signal output from the current voltage converter 531 is split into a first signal S1 and a second signal S2 at a branch portion jp1. In FIG. 1, a path of the first signal S1 is referred to as a first signal path ps1, and a path of the second signal S2 is referred to as a second signal path ps2.

The first bandpass filter 534, the second bandpass filter 535, and the third bandpass filter 539 are filters that selectively transmit signals in a specific frequency band.

The first delay adjuster 536 is a circuit that adjusts a delay of a signal using a memory that temporarily stores the signal. The multiplier 538 is a circuit that generates an output signal in proportion to a product of two input signals. The adder 542 is a circuit that generates an output signal in proportion to a sum of two input signals.

Next, an operation of the preprocessing unit 53 will be described along a flow of the first signal S1 and the second signal S2.

A group delay of the first signal S1 is adjusted by the first delay adjuster 536 after the first signal S1 passes through the first bandpass filter 534 disposed on the first signal path ps1. The group delay adjusted by the first delay adjuster 536 corresponds to a group delay of the second signal S2 caused by the second bandpass filter 535 to be described later. Such a delay adjustment is performed such that delay times accompanying with signals passing through filter circuits between the first bandpass filter 534 through which the first signal S1 passes and the second bandpass filter 535 and the third bandpass filter 539 through which the second signal S2 passes can be made uniform. The first signal S1 that passed through the first delay adjuster 536 is input to the adder 542 via the first AGC unit 540.

The second signal S2 is input to the multiplier 538 after the second signal S2 passes through the second bandpass filter 535 disposed on the second signal path ps2. The multiplier 538 multiplies the second signal S2 by the cosine wave signal cos ($\theta_m(t)$) output from the orthogonal signal generation unit 57. Thereafter, the second signal S2 passes through the third bandpass filter 539, and then is input to the adder 542 via the second AGC unit 541.

The adder 542 outputs a signal in proportion to a sum of the first signal S1 and the second signal S2.

1.2.2. Preprocessing

Next, a preprocessing in the preprocessing unit 53 will be described. For example, a system will be considered in the following description in which a frequency changes in a sinusoidal shape as a modulation signal and a displacement of the object to be measured 14 changes with simple vibration in an optical axis. Here, $E_m$, $E_d$, and $\varphi$ are expressed as follows.

$$E_m = a_m \{\cos(\omega_0 t + B \sin \omega_m t + \phi_m) + i \sin(\omega_0 t + B \sin \omega_m t \pm \phi_m)\} \quad (1)$$

$$E_d = a_d \{\cos(\omega_0 t + A \sin \omega_d t + \phi_d) + i \sin(\omega_0 t + A \sin \omega_d t + \phi_d)\} \quad (2)$$

$$\phi = \phi_m - \phi_d \quad (3)$$

A light detection signal $I_{PD}$ output from the current voltage converter 531 is theoretically expressed by the following Formula.

$$I_{PD} = \langle |E_m + E_d|^2 \rangle \quad (4)$$

$$= \langle |E_m^2 + E_d^2 + 2E_m E_d| \rangle$$

$$= a_m^2 + a_d^2 + 2a_m a_d \cos(B\sin\omega_m t - A\sin\omega_d t + \phi)$$

$E_m$, $E_d$, $\varphi_m$, $\varphi_d$, $\varphi$, $\omega_m$, $\omega_d$, $\omega_0$, $a_m$, and $a_d$ are expressed as follows.

$E_m$: Electric field component of modulation signal derived from optical modulator $E_d$: Electric field component of sample signal derived from object to be measured $\varphi_m$: Initial phase of modulation signal derived from optical modulator $\varphi_d$: Initial phase of sample signal derived from object to be measured $\varphi$: Optical path phase difference of laser interferometer $\omega_m$ Angular frequency of modulation signal derived from optical modulator $\omega_d$: Angular frequency of sample signal derived from object to be measured $\omega_0$: Angular frequency of emitted light emitted from light source $a_m$: Coefficient $a_d$: Coefficient In addition, < > in the Formula (4) represents a time average.

A first term and a second term in the Formula (4) represent DC components, and a third term represents an AC component. When the AC component is defined as $I_{PD\text{-}AC}$, $I_{PD\text{-}AC}$ satisfies the following Formula.

$$I_{PD\text{-}AC} = 2a_m a_d \cos(B\sin\omega_m t - A\sin\omega_d t + \phi) \quad (5)$$

$$= \frac{2a_m a_d \{\cos(B\sin\omega_m t)\cos(A\sin\omega_d t - \phi) +}{\sin(B\sin\omega_m t)\sin(A\sin\omega_d t - \phi)\}}$$

$$A = \frac{f_{dmax}}{f_d} \quad (6)$$

$$B = \frac{f_{mmax}}{f_m} \quad (7)$$

A: Phase shift of sample signal $f_{dmax}$: Doppler frequency shift of sample signal $f_d$: Frequency of sample signal B: Phase shift of modulation signal $f_{mmax}$: Doppler frequency shift of modulation signal $f_m$: Frequency of modulation signal Here, ν-order Bessel functions such as the following Formulas (8) and (9) are known.

$$\cos\{\xi \sin(2\pi f_v t)\} = J_0(\xi) + 2J_2(\xi) \cos(2\cdot 2\pi f_v t) + 2J_4(\xi) \cos(4\cdot 2\pi f_v t) + \quad (8)$$

$$\sin\{\xi \sin(2\pi f_v t)\} = 2J_1(\xi) \sin(1\cdot 2\pi f_v t) + 2J_3(\xi) \sin(3\cdot 2\pi f_v t) + \quad (9)$$

When the above-described Formula (5) is subjected to series expansion using the Bessel functions of the Formulas (8) and (9), the Formula (5) can be transformed into the following Formula (10).

$$I_{PD\text{-}AC} = 2a_m a_d [\{J_0(B) + 2J_2(B) \cos(2\cdot\omega_m t) + 2J_4(B) \cos(4\cdot\omega_m t) + \ldots\} \cos(A \sin\omega_d t - \phi) - \{2J_1(B) \sin(1\cdot\omega_m t) + 2J_3(B) \sin(3\cdot\omega_m t) + \ldots\} \sin(A \sin\omega_d t - \phi)] \quad (10)$$

$J_0(B)$, $J_1(B)$, $J_2(B)$ . . . are Bessel coefficients.

When such a transformation is made, theoretically, it can be said that a band corresponding to a specific order can be extracted by a bandpass filter.

Therefore, the preprocessing unit 53 executes a preprocessing on an AC component of the light detection signal in the following flow based on this theory.

First, an amplitude of an AC component of the light detection signal output from the current voltage converter 531 is normalized by the ADC 532. A signal that passed through the ADC 532 is expressed by the following Formula (10-1).

$$I_{ADC\_beat} = \{J_0(B) + 2J_2(B) \cos(2\omega_m t) + 2J_4(B) \cos(4\omega_m t) + \ldots\} \cos(A \sin\omega_d t - \phi) - 2\{J_0(B) + J_1(B) \sin(\omega_m t) + J_3(B) \sin(3\omega_m t) + \ldots\} \sin(A \sin\omega_d t - \phi) \quad (10\text{-}1)$$

The signal that passed through the ADC 532 is split into the first signal S1 and the second signal S2 at the branch portion jp1. The first signal S1 passes through the first bandpass filter 534. A center angular frequency of the first bandpass filter 534 is set to $\omega_m$. Accordingly, the first signal S1 that passed through the first bandpass filter 534 is expressed by the following Formula.

$$I_{BPF1} = \frac{J_1(B)\{-\cos(\omega_m t + A\sin\omega_d t - \phi) +}{\cos(\omega_m t - A\sin\omega_d t + \phi)\}} \quad (11)$$

$$= -2J_1(B)\sin(\omega_m t) \cdot \sin(A\sin\omega_d t - \phi)$$

On the other hand, the second signal S2 passes through the second bandpass filter 535. A center angular frequency of the second bandpass filter 535 is set to a value different from the center angular frequency of the first bandpass filter 534. Here, for example, the center angular frequency of the second bandpass filter 535 is set to $2\omega_m$. Accordingly, the second signal S2 that passed through the second bandpass filter 535 is expressed by the following Formula.

$$I_{BPF2} = 2J_2(B) \cos(2\omega_m t) \cdot \cos(A \sin\omega_d t - \phi) \quad (12)$$

The multiplier 538 multiplies the second signal S2 that passed through the second bandpass filter 535 by a cosine wave signal $\cos(\theta_m(t))$ output from the orthogonal signal generation unit 57 to be described later. The second signal S2 that passed through the multiplier 538 is expressed by the following Formula.

$$I_{538} = I_{BPF2} * \cos(\theta_m(t)) \quad (13)$$

$$= 2J_2(B)\cos(2\omega_m t) \cdot \cos(A\sin\omega_d t - \phi) \cdot \cos(\omega_m t - \alpha)$$

$$= \{J_2(B)\cos(A\sin\omega_d t - \phi)\} \cdot \{\cos(3\omega_m t - \alpha) + \cos(\omega_m t + \alpha)\}$$

In the above Formula (13), α is a shift width when a phase of the reference signal Ss is shifted from an original phase. The original phase is a phase when the preprocessing signal S(t) output from the preprocessing unit 53 is a signal subject to frequency modulation only or a signal equivalent to such a signal.

The second signal S2 that passed through the multiplier 538 passes through the third bandpass filter 539. A central angular frequency of the third bandpass filter 539 is set to the same value as the central angular frequency of the first bandpass filter 534. Here, for example, the central angular frequency of the third bandpass filter 539 is set to $\omega_m$.

Accordingly, the second signal S2 that passed through the third bandpass filter 539 is expressed by the following Formula.

$$I_{BPF3}=J_2(B)\cos(\omega_m t+\alpha)\cos(A\sin\omega_d t-\phi) \quad (14)$$

Thereafter, the first delay adjuster 536 adjusts a phase of the first signal S1 expressed by the above Formula (11), and the first AGC unit 540 adjusts an amplitude of the first signal S1.

The second AGC unit 541 adjusts an amplitude of the second signal S2 expressed by the above Formula (14), and the amplitude of the second signal S2 is made equal to the amplitude of the first signal S1. The first signal S1 after the amplitude adjustment is expressed by the following Formula (14-1), and the second signal S2 after the amplitude adjustment is expressed by the following Formula (14-2).

$$I_{AGC1}=-\sin(\omega_m t)\cdot\sin(A\sin\omega_d t-\phi) \quad (14\text{-}1)$$

$$I_{AGC2}=\cos(\omega_m t+\alpha)\cos(A\sin\omega_d t-\phi) \quad (14\text{-}2)$$

Then, the first signal S1 and the second signal S2 are added by the adder 542. A result of the addition is referred to as the preprocessing signal S(t). The preprocessing signal S(t) is expressed by the following Formula (15).

$$S(t) = I_{AGC1} + I_{AGC2} \quad (15)$$
$$= -\sin(\omega_m t)\cdot\sin(A\sin\omega_d t - \phi) + \cos(\omega_m t + \alpha)\cos(A\sin\omega_d t - \phi)$$

As in the above Formula (15), the preprocessing signal S(t) is expressed by a formula including the phase shift width α. Therefore, when the phase shift width α is an integral multiple of π, the above Formula (15) is expressed by the following Formula (15-1).

$$S(t) = -\sin(\omega_m t)\cdot\sin(A\sin\omega_d t - \phi) + \cos(\omega_m t)\cos(A\sin\omega_d t - \phi) \quad (15\text{-}1)$$
$$= \cos(\omega_m t + A\sin\omega_d t - \phi)$$

In the present specification, when the preprocessing signal S(t) is expressed by the above Formula (15-1), it is said that "phases are aligned". On the other hand, when the preprocessing signal S(t) is expressed by the above Formula (15) and the phase shift width α is not an integral multiple of π, it is said that "phases are not aligned".

When phases are aligned, the preprocessing signal S(t) is expressed by the above Formula (15-1), and thus it can be said that the preprocessing signal S(t) is a signal subject to frequency modulation only. Since a frequency modulation component is extracted from the preprocessing signal S(t), demodulation accuracy of a sample signal is improved in the demodulation processing unit 55. On the other hand, when phases are not aligned, it can be said that the preprocessing signal S(t) is a signal in which frequency modulation and amplitude modulation are superimposed. For such a preprocessing signal S(t), it is difficult to improve demodulation accuracy of a sample signal in the demodulation processing unit 55.

1.2.3. Configuration of Orthogonal Signal Generation Unit

The orthogonal signal generation unit 57 shown in FIG. 1 includes a fourth bandpass filter 571, a Hilbert transform filter 572, a second delay adjuster 573 (a reference signal delay device), a reference signal phase calculator 574, an absolute value calculator 577, a third low-pass filter 578, a phase amount setting unit 579, an adder 580, a cosine calculator 581, and a sine calculator 582.

In the present embodiment, the orthogonal signal generation unit 57 generates a cosine wave signal $\cos(\theta_m(t))$ and a sine wave signal $\sin(\theta_m(t))$ that are orthogonal signals based on a phase of the reference signal Ss and an amplitude of the preprocessing signal S(t). In the present specification, such a processing of generating an orthogonal waveform is referred to as an "orthogonal waveform generation processing".

An ADC 533 is coupled between the oscillation circuit 54 and the fourth bandpass filter 571. The ADC 533 is an analog-to-digital converter, and converts an analog signal into a digital signal with a predetermined number of sampling bits. The fourth bandpass filter 571 is a filter that selectively transmits a signal of a specific frequency band.

The Hilbert transform filter 572 performs a Hilbert transform processing on the reference signal Ss to obtain a signal i. The reference signal Ss output from the oscillation circuit 54 is a signal represented by $\cos(\omega_m t)$. $\omega_m$ is an angular frequency of a signal modulated by the optical modulator 12, and t is a time. The Hilbert transform processing is a processing of shifting a phase of the reference signal Ss by π/2.

The second delay adjuster 573 is a circuit that adjusts a delay of a signal by using a memory that temporarily stores the signal, and generates, in the reference signal Ss, a delay equivalent to a delay generated by the Hilbert transform processing. As a result, a signal r is obtained.

The reference signal phase calculator 574 calculates a phase of the reference signal Ss based on the signal i output from the Hilbert transform filter 572 and the signal r output from the second delay adjuster 573. Specifically, an arctangent calculation, that is, an a tan (i/r) calculation is performed on a ratio of the signal i to the signal r.

The absolute value calculator 577 calculates an absolute value of the preprocessing signal S(t) output from the preprocessing unit 53. The third low-pass filter 578 is a filter that cuts off a signal in a high frequency band for the absolute value of the preprocessing signal S(t) output from the absolute value calculator 577.

The phase amount setting unit 579 has a function of acquiring an envelope of a signal output from the third low-pass filter 578, a function of acquiring a maximum value and a minimum value of the envelope (an amplitude of the envelope), and a function of outputting a phase amount a.

The adder 580 outputs a signal in proportion to a sum of an output from the reference signal phase calculator 574 and an output from the phase amount setting unit 579. The cosine calculator 581 generates a cosine wave signal $\cos(\theta_m(t))$ based on the signal output from the adder 580. The sine calculator 582 generates a sine wave signal $\sin(\theta_m(t))$ based on the signal output from the adder 580.

1.2.4. Orthogonal Waveform Generation Processing

In the orthogonal waveform generation processing, first, the reference signal Ss output from the ADC 533 is input to the fourth bandpass filter 571. A center angular frequency of the fourth bandpass filter 571 is set to $\omega_m$. The reference signal Ss output from the fourth bandpass filter 571 is split into two signals, one of the two signals is input to the Hilbert transform filter 572, and the other one is input to the second delay adjuster 573.

The Hilbert transform filter 572 generates the signal i by shifting a phase of the reference signal Ss by $\pi/2$. The second delay adjuster 573 delays the reference signal Ss and generates the signal r. The signal i and the signal r are input to the reference signal phase calculator 574.

The reference signal phase calculator 574 performs an a tan (i/r) calculation and acquires a phase of the reference signal Ss. A calculation result a tan (i/r) is input to the adder 580.

On the other hand, the absolute value calculator 577 acquires an absolute value of the preprocessing signal S(t). As a result, a waveform at a negative side of the preprocessing signal S(t) can be converted to a waveform at a positive side and is synthesized. A signal from the absolute value calculator 577 is input to the third low-pass filter 578.

The third low-pass filter 578 cuts off a signal in a high frequency band. As a result, it is possible to acquire the envelope in the phase amount setting unit 579 in an easy and high accurate manner. A signal from the third low-pass filter 578 is input to the phase amount setting unit 579.

The phase amount setting unit 579 sets a phase amount a to be added to the calculation result a tan (i/r) of the adder 580 based on the signal from the third low-pass filter 578. That is, the orthogonal signal generation unit 57 adjusts a phase of the reference signal Ss. A setting method will be described later.

The adder 580 calculates a sum of an output from the reference signal phase calculator 574 and an output from the phase amount setting unit 579. Here, the sum is β. β=a+a tan (i/r). The cosine calculator 581 generates a cosine wave signal cos $(\theta_m(t))$, and the sine calculator 582 generates a sine wave signal sin $(\theta_m(t))$. The cosine wave signal cos $(\theta_m(t))$ is input to the multiplier 538 and the demodulation processing unit 55 to be described later, and the sine wave signal sin $(\theta_m(t))$ is input to the demodulation processing unit 55. $\theta_m(t)=\omega_m t-\beta$.

1.2.5. Phase Amount Setting Method

The phase amount setting unit 579 sets the phase amount a to be added by the adder 580 such that an influence of the above-described amplitude modulation is minimized when phases are not aligned. Accordingly, the cosine calculator 581 generates the cosine wave signal cos $(\theta_m(t))$ and the sine calculator 582 generates the sine wave signal sin $(\theta_m(t))$ based on the phase amount a. In this case, the cosine wave signal cos $(\theta_m(t))$ is reflected in the preprocessing signal S(t) via the multiplier 538, and an influence of amplitude modulation on the preprocessing signal S(t) is reduced. Finally, phases can be aligned. When the cosine wave signal cos $(\theta_m(t))$ and the sine wave signal sin $(\theta_m(t))$ in a case where phases are aligned are input to the demodulation processing unit 55, a demodulation processing from the preprocessing signal S(t) can be performed with high accuracy.

Figure 13:
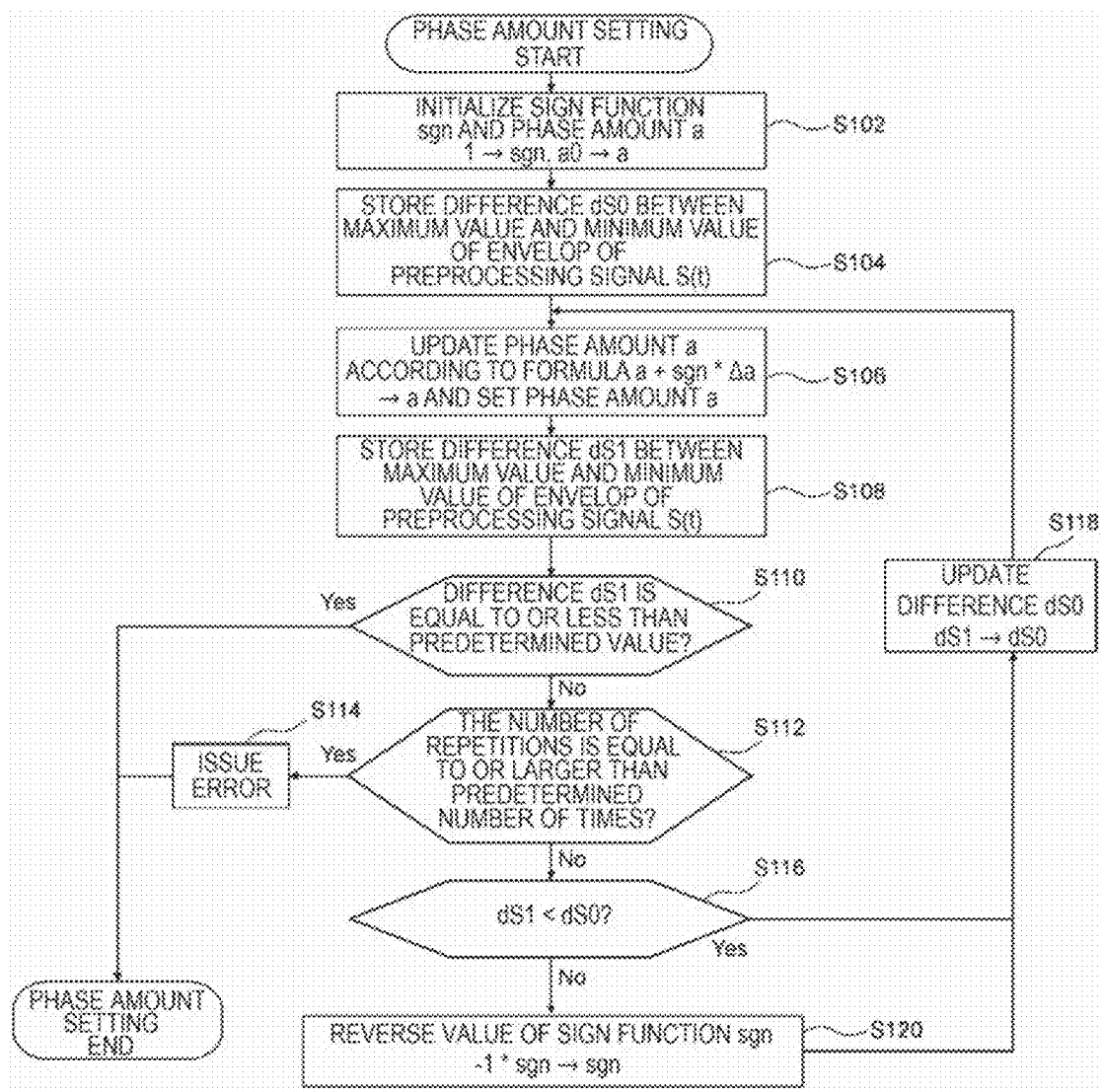
FIG. 13 is a flowchart showing an example of a method for a phase amount setting unit shown in FIG. 1 to set a phase amount.

FIG. 13 is a flowchart showing an example of a method for the phase amount setting unit 579 shown in FIG. 1 to set a phase amount. The phase amount setting shown in FIG. 13 is preferably performed using a standard sample that vibrates at a single frequency as the object to be measured 14. As a result, the phase amount setting unit 579 can more accurately obtain the phase amount a to be added in the adder 580. In the phase amount setting method shown in FIG. 13, an amplitude of the preprocessing signal S(t) is repeatedly evaluated while gradually changing a value of the phase amount a. The phase amount a when the amplitude is equal to or less than a predetermined value is stored in a memory as an optimum value. After the optimum phase amount a is calculated, the phase amount a is fixed, and thus it is possible to perform highly accurate measurement for various kinds of the objects to be measured 14.

Therefore, the phase amount setting method shown in FIG. 13 is performed using the above-described standard sample, for example, before the laser interferometer 1 measures the object to be measured 14. As a result, the laser interferometer 1 can be automatically calibrated. Examples of the standard sample include a piezoelectric element and a quartz crystal resonator.

In step S102 shown in FIG. 13, first, a sign function sgn and the phase amount a are initialized. Specifically, a value 1 is input to the sign function sgn, and a value a0 is input to the phase amount a. The value a0 can be set freely.

In step S104, the envelope of the preprocessing signal S(t) is acquired via the absolute value calculator 577 and the third low-pass filter 578. Examples of a method of acquiring the envelope include a method using a low-pass filter and a method using a Hilbert transform. In step S104, a maximum value and a minimum value of the envelope are acquired, and a difference dS0 between the maximum value and the minimum value is stored in a memory. The difference dS0 corresponds to an amplitude of the preprocessing signal S(t).

In step S106, the phase amount setting unit 579 updates the phase amount a according to a Formula "a+sgn*Δa→a", and sets the updated phase amount a as an output value. This Formula refers to that a minute amount Δa is added to or subtracted from a current value of the phase amount a based on two values that the sign function sgn can take, that is, 1 or −1, and a new phase amount a is obtained. The minute amount Δa is not particularly limited as long as the minute amount Δa is smaller than the phase amount a. The updated phase amount a is output to the adder 580. In this case, the orthogonal signal generation unit 57 adjusts the phase of the reference signal Ss based on the new phase amount a set by the phase amount setting unit 579, and generates two orthogonal signals, that is, a cosine wave signal cos $(\theta_m(t))$ and a sine wave signal sin $(\theta_m(t))$. The preprocessing unit 53 generates a new preprocessing signal S(t) based on the cosine wave signal cos $(\theta_m(t))$.

In step S108, a difference between a maximum value and a minimum value of an envelope is acquired for the new preprocessing signal S(t) in the similar manner as the difference acquired in step S104, and is stored in a memory. In step S108, this difference is defined as dS1.

In step S110, it is determined whether the difference dS1 is equal to or smaller than a predetermined value. The predetermined value is, for example, the difference between the maximum value and the minimum value of the envelope in a case where the preprocessing signal S(t) can be regarded as a signal subject to frequency modulation only. Therefore, when the difference dS1 is equal to or smaller than the predetermined value, it can be determined that the current phase amount a is optimal. Therefore, the flow ends. On the other hand, when the difference dS1 is larger than the predetermined value, it can be determined that the current phase amount a is not optimal, and thus the processing proceeds to step S112.

In step S112, the number of times the determination in step S110 was performed is acquired. Then, it is determined whether the acquired number of times is equal to or larger than a predetermined number of times. The predetermined number of times is, for example, an actual value of the number of repetitions when the optimum phase amount a can be calculated in a case where an amplitude of the preprocessing signal S(t) is repeatedly evaluated while gradually changing the value of the phase amount a as described above, and in particular, a maximum value of the actual value can be adopted. A specific example of the number of repetitions includes the number of times the phase amount a is updated.

When the acquired number of times is equal to or larger than the predetermined number of times, it can be determined that it is difficult to calculate the optimum phase amount a, and thus the processing proceeds to step S114. In step S114, the phase amount setting unit 579 issues an error. In this case, a message indicating that an error occurs may be displayed on the display unit described above, and a user may be suggested to deal with the error by, for example, changing a standard sample. After the error is issued, the flow ends.

On the other hand, when the acquired number of times is less than the predetermined number of times, the processing proceeds to step S116.

In step S116, it is determined whether the difference dS0> the difference dS1. When the difference dS0> the difference dS1, it can be determined that the influence of amplitude modulation on the new preprocessing signal S(t) is reduced. In addition, it can be determined that a value of the sign function sgn at the time of initialization in step S102 is appropriate. In this case, the processing proceeds to step S118. In step S118, a current value of the difference dS1 is input to the difference dS0. Then, the processing returns to step S106. In the second step S106, the phase amount a is updated again according to the Formula a+sgn*Δa→a. Since it is determined that the sign function sgn in the Formula is appropriate, the sign function sgn is not changed. The preprocessing unit 53 generates a new preprocessing signal S(t) in which the updated phase amount a is reflected.

In the second step S108, the difference between the maximum value and the minimum value of the envelope is acquired for the new preprocessing signal S(t), and is stored in the memory. The difference dS1 acquired in the second step S108 is smaller than the difference dS1 acquired in the first step S108. Therefore, the influence of amplitude modulation on the new preprocessing signal S(t) is further reduced, and the preprocessing signal S(t) is brought close to a signal subject to frequency modulation only.

On the other hand, when the difference dS0 is not larger than the difference dS1 in step S116, that is, when the difference dS0≤ the difference dS1, it can be determined that the influence of amplitude modulation on the new preprocessing signal S(t) is not reduced. In addition, it can be determined that the value of the sign function sgn at the time of initialization in step S102 is not appropriate. In this case, the processing proceeds to step S120.

In step S120, the sign function sgn is reversed from the current value. That is, a value obtained by multiplying the current value by −1 is input to the new sign function sgn. Thereafter, the processing proceeds to step S118.

According to the flow shown in FIG. 13, unless an error is issued, the update of the phase amount a, the update of the preprocessing signal S(t), and the update of the difference dS0 are repeated until the difference dS1 is equal to or less than a predetermined value. As a result, the phase amount a is adjusted by the phase amount setting unit 579 until the preprocessing signal S(t) can be regarded as a signal subject to frequency modulation only, and a cosine wave signal cos ($\theta_m(t)$) and a sine wave signal sin ($\theta_m(t)$) that are orthogonal signals are generated based on the phase amount a.

The cosine wave signal cos ($\theta_m(t)$) generated in this manner is input to the preprocessing unit 53, so that the preprocessing signal S(t) can be brought close to an original phase. As a result, the laser interferometer 1 can be calibrated. Then, after the calibration, the object to be measured 14 may be measured by using the obtained optimum phase amount a. Accordingly, accuracy of demodulating a sample signal from a light detection signal can be increased, and the object to be measured 14 can be measured with high accuracy.

The calibration of the laser interferometer 1 may be performed at any timing and at any frequency.

1.2.6. Configuration of Demodulation Processing Unit

The demodulation processing unit 55 executes a demodulation processing of demodulating a sample signal that is derived from the object to be measured 14 from the preprocessing signal S(t). The demodulation processing is not particularly limited, and a known quadrature detection method may be used. The quadrature detection method is a method for executing the demodulation processing by performing an operation of mixing external signals orthogonal to each other with an input signal.

The demodulation processing unit 55 shown in FIG. 1 is a digital circuit including a multiplier 551, a multiplier 552, an inverting amplifier 553, a first low-pass filter 555, a second low-pass filter 556, a divider 557, an arctangent calculator 558, and a signal output unit 559.

The multipliers 551 and 552 are circuits that generate an output signal in proportion to a product of two input signals. The inverting amplifier 553 is a circuit that generates an output signal in which a gain is −1 times, an amplitude is not changed, and a phase of an input signal is inverted. The first low-pass filter 555 and the second low-pass filter 556 are filters that cut off signals in a high frequency band.

The divider 557 is a circuit that generates an output signal in proportion to a quotient of two input signals. The arctangent calculator 558 is a circuit that outputs an arctangent of an input signal. The signal output unit 559 calculates a phase $\varphi_d$ as information derived from the object to be measured 14 from a phase $\varphi$ acquired by the arctangent calculator 558. The signal output unit 559 performs a phase connection when there is a phase jump of $2\pi$ at two adjacent points by performing a phase unwrapping processing. A displacement of the object to be measured 14 is calculated based on the obtained phase information. As a result, a function serving as a displacement meter is achieved. In addition, a speed of the object to be measured 14 can be calculated based on the displacement. As a result, a function serving as a speedometer is achieved.

The demodulation processing unit 55 is not limited to a digital circuit, and may be an analog circuit. The analog circuit may include an F/V converter circuit or a ΔΣ counter circuit.

The demodulation processing unit 55 above may calculate frequency information derived from the object to be measured 14. A speed of the object to be measured 14 can be calculated based on the frequency information.

1.2.7. Demodulation Processing

In a demodulation processing, first, the preprocessing signal S(t) is split into two signals at a branch portion jp2. The multiplier 551 multiplies one of the split signals by the sine wave signal sin ($\theta_m(t)$) output from the sine calculator 582 via the inverting amplifier 553. That is, the multiplier 551 mixes a signal −sin ($\theta_m(t)$) obtained by inverting a phase of the sine wave signal sin ($\theta_m(t)$) with the preprocessing signal S(t). The multiplier 552 multiplies the other split signal by a cosine wave signal cos ($\theta_m$(t)) output from the cosine calculator 581. That is, the multiplier 552 mixes the cosine wave signal cos ($\theta_m$(t)) with the preprocessing signal S(t).

The signal that passed through the multiplier 551 passes through the first low-pass filter 555, and then is input to the divider 557 as a signal y. The signal that passed through the multiplier 552 passes through the second low-pass filter 556, and then is input to the divider 557 as a signal x. In the present specification, the signals x and y are collectively referred to as a "mixed signal". The divider 557 divides the signal y by the signal x, and an output y/x passes through the arctangent calculator 558 to obtain a calculation result a tan (y/x). As a result, phase information of a sample signal is obtained.

Thereafter, the calculation result a tan (y/x) is input to the signal output unit 559 to output a displacement and a speed of the object to be measured 14.

Figure 14:
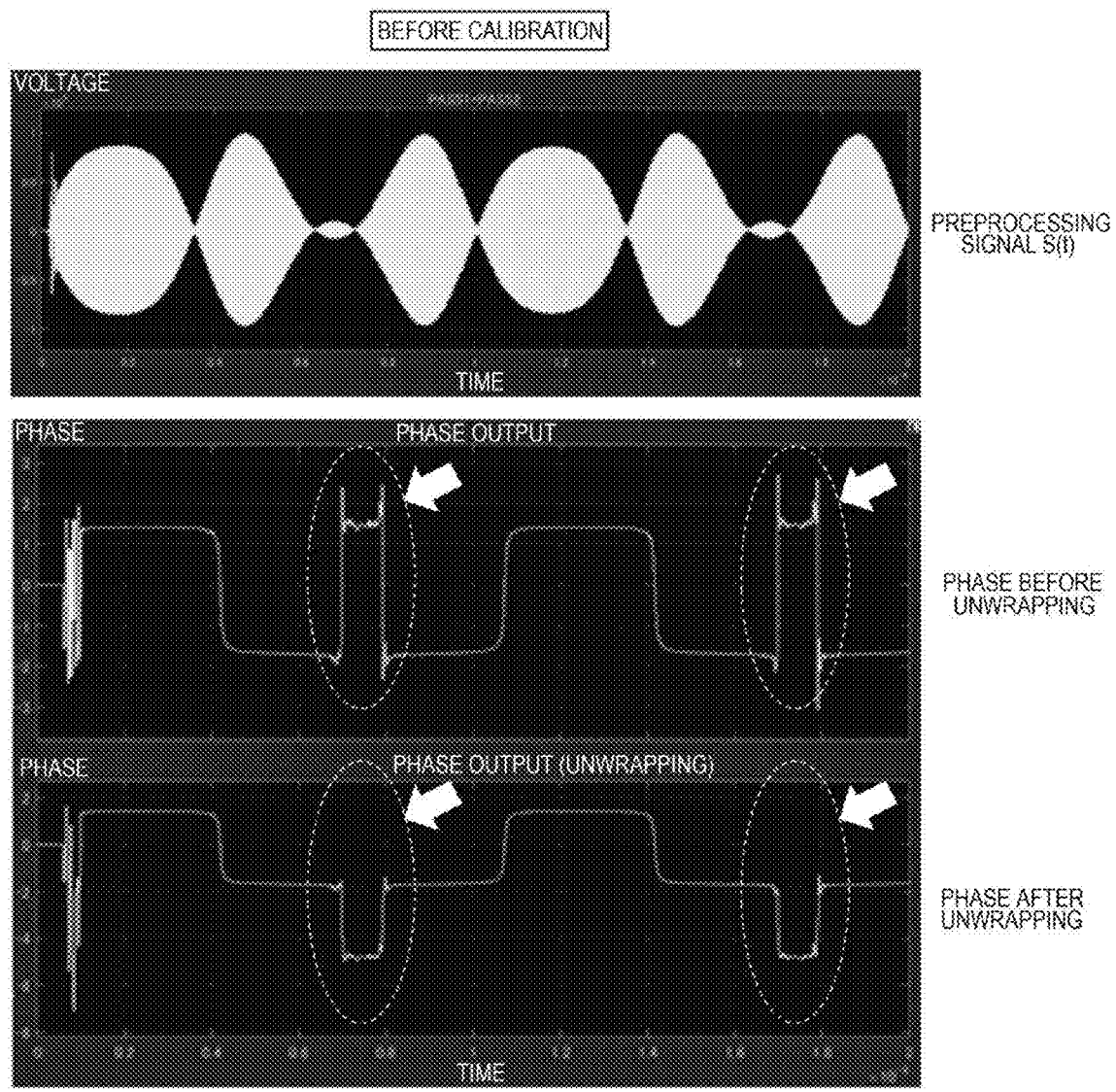
FIG. 14 shows an example of waveforms indicating a preprocessing signal S(t) before the laser interferometer performs a calibration based on a flow shown in FIG. 13, phase information demodulated by a demodulation processing unit (phase information before unwrapping), and phase information subjected to a phase unwrapping processing of a signal output unit (phase information after unwrapping).

FIG. 14 shows an example of waveforms indicating a preprocessing signal S(t) before the laser interferometer 1 performs a calibration based on a flow shown in FIG. 13, phase information demodulated by the demodulation processing unit 55 (phase information before unwrapping), and phase information subjected to a phase unwrapping processing of the signal output unit 559 (phase information after unwrapping).

As shown in FIG. 14, the waveform of the preprocessing signal S (t) before the calibration has a large change in amplitude, and the preprocessing signal S(t) is a signal in which frequency modulation and amplitude modulation are superimposed. Therefore, an amplitude of the envelope of the preprocessing signal S(t) is increased. Therefore, in the phase information before unwrapping shown in FIG. 14, irregular waveforms are generated at positions indicated by arrows, and the waveform of the phase information after unwrapping is a discontinuous waveform. In this case, it is difficult to accurately calculate a displacement of the object to be measured 14 based on the phase information after unwrapping.

Figure 15:
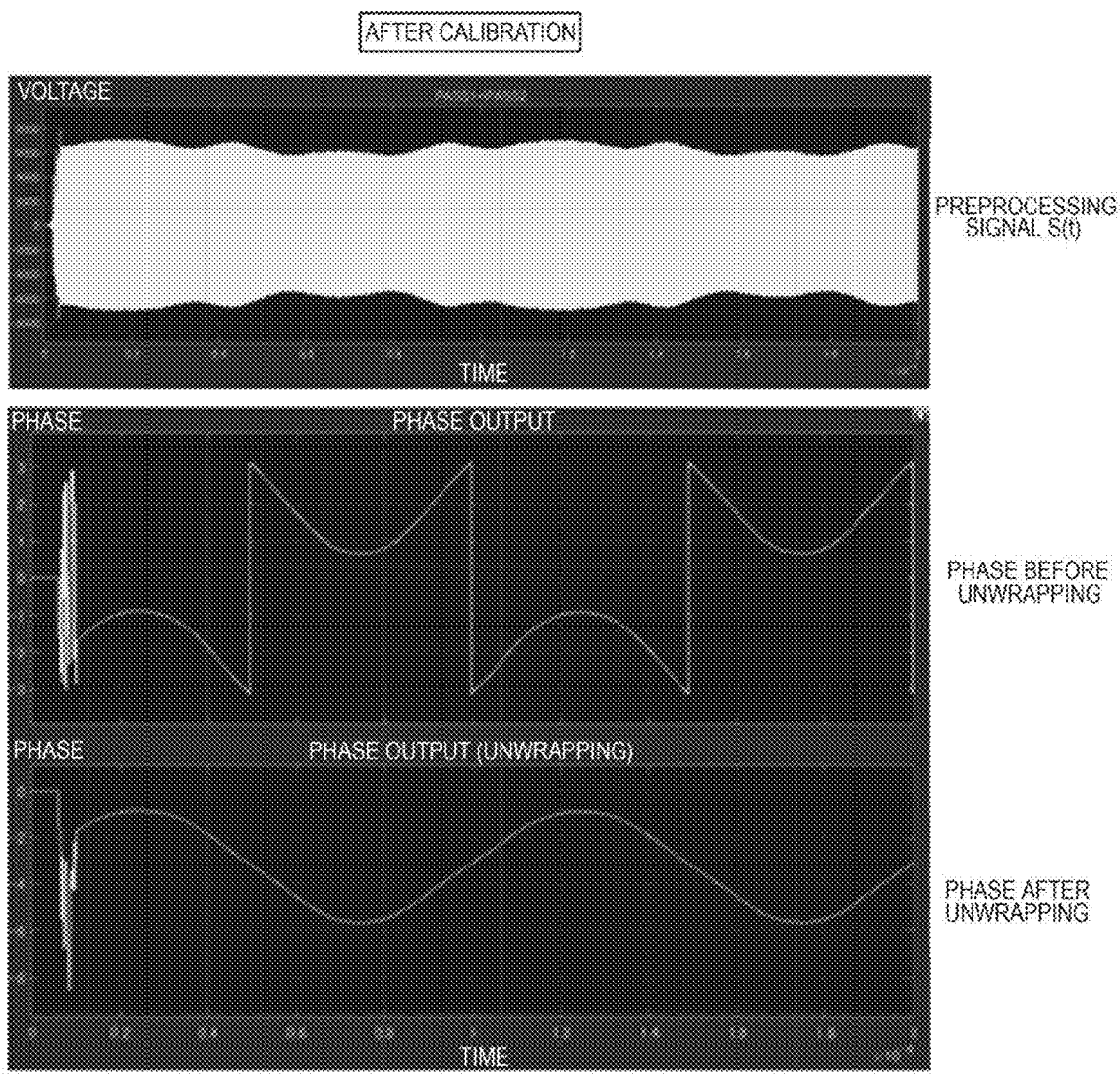
FIG. 15 shows an example of waveforms indicating a preprocessing signal S(t) after the laser interferometer performs a calibration based on the flow shown in FIG. 13, phase information demodulated by the demodulation processing unit (phase information before unwrapping), and phase information subjected to a phase unwrapping processing of the signal output unit (phase information after unwrapping).

FIG. 15 shows an example of waveforms indicating a preprocessing signal S(t) after the laser interferometer 1 performs a calibration based on the flow shown in FIG. 13, phase information demodulated by the demodulation processing unit 55 (phase information before unwrapping), and phase information subjected to a phase unwrapping processing of the signal output unit 559 (phase information after unwrapping).

As shown in FIG. 15, the waveform of the preprocessing signal S(t) after the calibration has a small change in amplitude, and the preprocessing signal S(t) is substantially a signal subject to frequency modulation only. Therefore, an amplitude of the envelope of the preprocessing signal S(t) is reduced. Therefore, no irregular waveform is generated in the phase information before unwrapping shown in FIG. 15. In addition, the waveform of the phase information after unwrapping shown in FIG. 15 is a continuous waveform. In this case, a displacement of the object to be measured 14 can be accurately calculated based on the phase information after unwrapping.

1.2.8. Effect of First Embodiment

As described above, the laser interferometer 1 according to the present embodiment includes the laser light source 2, the optical modulator 12, the light receiving element 10, and the calculation unit 52. The laser light source 2 emits the emitted light L1 (the first laser light). The optical modulator 12 includes the resonator element 30, modulates the emitted light L1 using the resonator element 30, and generates the reference light L2 (the second laser light) including a modulation signal. The light receiving element 10 receives the reference light L2 and the object light L3 (the third laser light) including a sample signal generated by the object to be measured 14 reflecting the emitted light L1, and outputs a light reception signal. The calculation unit 52 calculates a displacement of the object to be measured 14 from the light reception signal based on the reference signal Ss.

The calculation unit 52 includes the preprocessing unit 53, the demodulation processing unit 55, and the orthogonal signal generation unit 57. The preprocessing unit 53 executes a preprocessing of extracting a frequency modulation component from the light reception signal, and outputs the preprocessing signal S(t). The demodulation processing unit 55 mixes the preprocessing signal S(t) with orthogonal signals to obtain the signals x and y (a mixed signal), and then executes a demodulation processing of extracting a sample signal from the signals x and y. In the present embodiment, the orthogonal signal generation unit 57 generates the orthogonal signals described above based on a phase of the reference signal Ss and an amplitude of the preprocessing signal S(t).

With such a configuration, the orthogonal signal generation unit 57 adjusts the phase of the reference signal Ss based on the amplitude of the preprocessing signal S(t). Then, a cosine wave signal cos ($\theta_m$(t)) that is a signal after the adjustment is input to the preprocessing unit 53, so that the preprocessing signal S(t) can be brought close to a signal subject to frequency modulation only, and accuracy of demodulating a sample signal that is derived from the object to be measured 14 from the light reception signal can be increased. In other words, it is possible to calibrate the laser interferometer 1 so as to execute the demodulation processing with high accuracy. As a result, even when the reference signal Ss output from the oscillation circuit 54 is used, it is possible to implement the laser interferometer 1 capable of measuring a displacement and a speed of the object to be measured 14 with high accuracy. Accordingly, it is easy to reduce a size and a weight of the laser interferometer 1, and it is easy to reduce costs.

The orthogonal signal generation unit 57 includes the phase amount setting unit 579 that sets phases of the orthogonal signals based on the amplitude of the preprocessing signal S(t).

As described above, the phase amount setting unit 579 has a function of setting a phase amount a to be added in the adder 580. The orthogonal signal generation unit 57 adjusts the phase of the reference signal Ss based on the phase amount a, and generates orthogonal signals, that is, the cosine wave signal cos ($\theta_m$(t)) and the sine wave signal sin ($\theta_m$(t)). The demodulation processing unit 55 mixes the orthogonal signals with the preprocessing signal S(t). It is possible to align the phase of the preprocessing signal S(t) and the phases of the orthogonal signals by appropriately setting the phase amount a. As a result, the demodulation processing unit 55 can execute a demodulation processing from the preprocessing signal S(t) with high accuracy.

The phase amount setting unit 579 sets phases of the orthogonal signals such that a difference between a maximum value of the amplitude of the preprocessing signal S(t) and a minimum value of the amplitude of the preprocessing signal S(t) is equal to or less than a predetermined value.

As a result, the optimum phase amount a can be efficiently set in the phase amount setting unit 579 so that the preprocessing signal S(t) becomes a signal subject to frequency modulation only or a signal equivalent to such a signal.

The orthogonal signal generation unit 57 includes the Hilbert transform filter 572, the second delay adjuster 573 (the reference signal delay device), and the reference signal phase calculator 574. The Hilbert transform filter 572 performs a Hilbert transform processing on the reference signal Ss to obtain a signal i. The second delay adjuster 573 delays the reference signal Ss to obtain a signal r. The reference signal phase calculator 574 performs an arctangent calculation on a ratio of the signal i to the signal r to obtain a phase of the reference signal Ss.

With such a configuration, the phase of the reference signal Ss can be instantaneously obtained without sampling the reference signal Ss. Therefore, in the orthogonal signal generation unit 57 including such a phase amount setting unit 579, the phase of the reference signal Ss can be reflected in the orthogonal signals in a short time. As a result, the phase amount setting unit 579 can quickly set the optimum phase amount a.

2. Second Embodiment

Next, a laser interferometer according to a second embodiment will be described.

Figure 16:
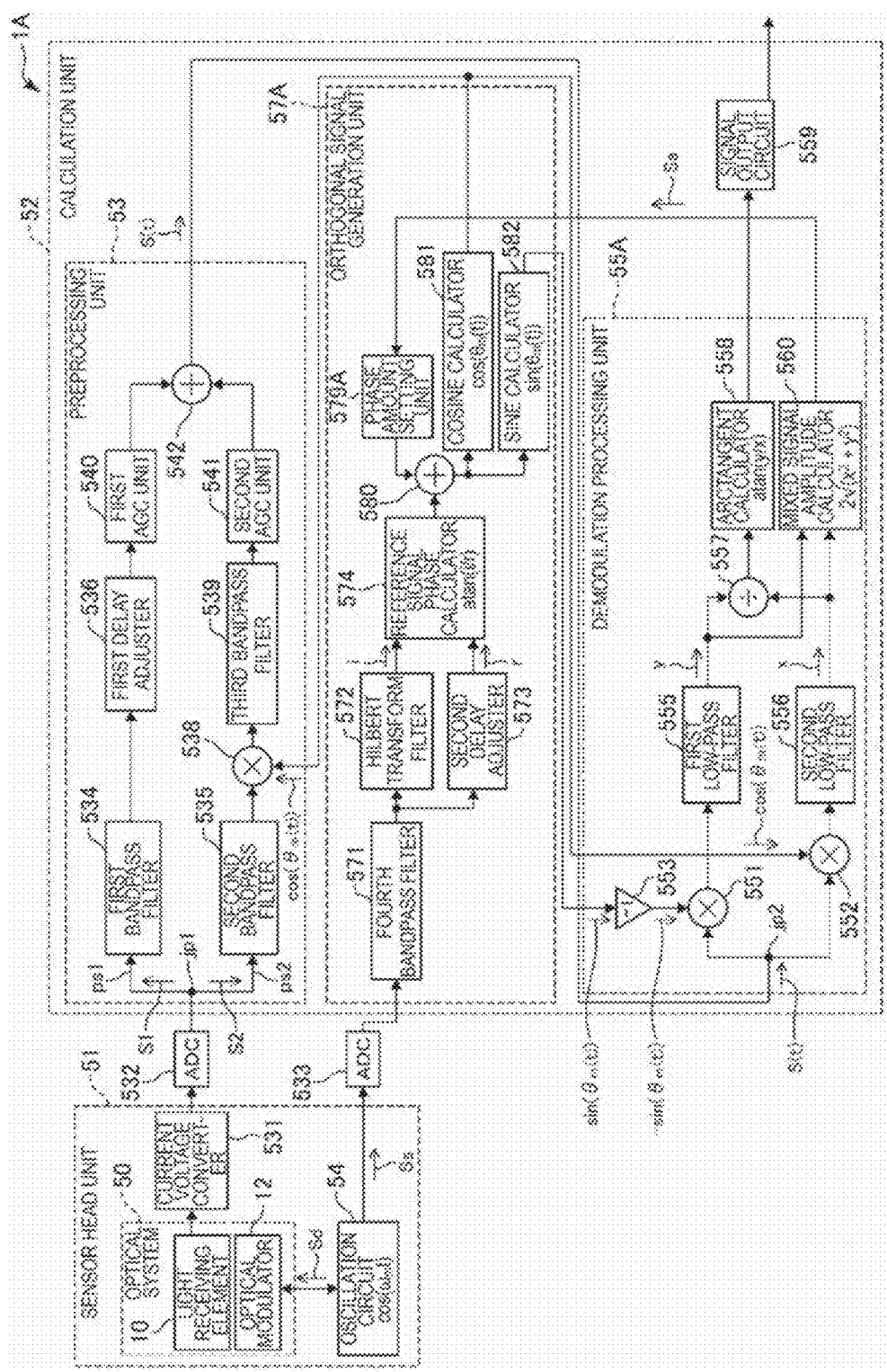
FIG. 16 is a functional block diagram showing a laser interferometer according to a second embodiment.

FIG. 16 is a functional block diagram showing a laser interferometer according to the second embodiment.

Hereinafter, the second embodiment will be described. In the following description, differences from the first embodiment will be mainly described, and description of the similar matters will be omitted. In FIG. 16, the similar components as those of the first embodiment are denoted by the same reference numerals.

In the first embodiment described above, the orthogonal signal generation unit 57 generates orthogonal signals based on the phase of the reference signal Ss and the amplitude of the preprocessing signal S (t) acquired from the envelope of the preprocessing signal S(t). In contrast, in the present embodiment, an orthogonal signal generation unit 57A generates orthogonal signals based on the phase of the reference signal Ss and amplitudes of the signals x and y (a mixed signal).

2.1. Demodulation Processing Unit

A demodulation processing unit 55A shown in FIG. 16 is similar to the demodulation processing unit 55 shown in FIG. 1 except that a mixed signal amplitude calculator 560 is added.

The mixed signal amplitude calculator 560 is a circuit that calculates $2(x^2+y^2)^{1/2}$ for two input signals of the signal x and the signal y, and outputs a calculation result. This calculation result corresponds to an "amplitude of a mixed signal". In the present specification, a signal output from the mixed signal amplitude calculator 560 is referred to as an "amplitude signal Sa".

2.2. Orthogonal Signal Generation Unit

The orthogonal signal generation unit 57A shown in FIG. 16 is similar to the orthogonal signal generation unit 57 shown in FIG. 1 except that the absolute value calculator 577 and the third low-pass filter 578 are omitted and the amplitude signal Sa output from the mixed signal amplitude calculator 560 is input to a phase amount setting unit 579A.

The phase amount setting unit 579A has a function of acquiring a maximum value and a minimum value of the amplitude signal Sa and a function of outputting the phase amount a. Therefore, a phase amount setting method of the phase amount setting unit 579A is similar to the method shown in FIG. 13 except that the "envelope of the preprocessing signal S (t)" shown in FIG. 13 is replaced with the "amplitude signal Sa".

2.3. Effect of Second Embodiment

Similar to the first embodiment, a laser interferometer 1A according to the present embodiment includes the laser light source 2, the optical modulator 12, the light receiving element 10, and the calculation unit 52. As shown in FIG. 16, the calculation unit 52 includes the preprocessing unit 53, the demodulation processing unit 55A, and the orthogonal signal generation unit 57A. The preprocessing unit 53 executes a preprocessing of extracting a frequency modulation component from the light reception signal, and outputs the preprocessing signal S(t). The demodulation processing unit 55A mixes the preprocessing signal S(t) with orthogonal signals to obtain the signals x and y (a mixed signal), and then executes a demodulation processing of extracting a sample signal from the signals x and y. The orthogonal signal generation unit 57A generates orthogonal signals based on the phase of the reference signal Ss and amplitudes of the signals x and y.

With such a configuration, the orthogonal signal generation unit 57A adjusts the phase of the reference signal Ss based on the amplitude signal Sa. Then, a cosine wave signal cos ($\theta_m(t)$) that is a signal after the adjustment is input to the preprocessing unit 53, so that the preprocessing signal S(t) can be brought close to a signal subject to frequency modulation only, and accuracy of demodulating a sample signal that is derived from the object to be measured 14 from the light reception signal can be increased. As a result, the laser interferometer 1A can be calibrated. As a result, even when the reference signal Ss output from the oscillation circuit 54 is used, it is possible to implement the laser interferometer 1A capable of measuring a displacement and a speed of the object to be measured 14 with high accuracy. Accordingly, it is easy to reduce a size and a weight of the laser interferometer 1A, and it is easy to reduce costs.

The orthogonal signal generation unit 57A includes the phase amount setting unit 579 that sets phases of the orthogonal signals based on the amplitudes of the signals x and y (the mixed signal).

Similar to the phase amount setting unit 579, the phase amount setting unit 579A has a function of setting the phase amount a to be added by the adder 580. Similar to the orthogonal signal generation unit 57, the orthogonal signal generation unit 57A adjusts the phase of the reference signal Ss based on the phase amount a, and generates orthogonal signals, that is, the cosine wave signal cos ($\theta_m(t)$) and the sine wave signal sin ($\theta_m(t)$). The demodulation processing unit 55 mixes the orthogonal signals with the preprocessing signal S (t). It is possible to align phases of the preprocessing signal S(t) and the orthogonal signals by appropriately setting the phase amount a. As a result, the demodulation processing unit 55 can execute a demodulation processing from the preprocessing signal S(t) with high accuracy.

The phase amount setting unit 579A sets phases of the orthogonal signals such that a difference between a maximum value of the amplitudes of the signals x and y (the mixed signal) and a minimum value of the amplitudes of the signals x and y (the mixed signal) is equal to or less than a predetermined value.

As a result, the optimum phase amount a can be efficiently set in the phase amount setting unit 579A so that the preprocessing signal S(t) becomes a signal subject to frequency modulation only or a signal equivalent to such a signal.

In addition, the demodulation processing unit 55A shown in FIG. 16 includes the mixed signal amplitude calculator 560 that obtains the amplitudes of the signals x and y (the mixed signal).

With such a configuration, the amplitude of the preprocessing signal S(t) can be obtained without acquiring the envelope of the preprocessing signal S(t). That is, the absolute value calculator 577 and the third low-pass filter 578 in the first embodiment can be omitted. As a result, the configuration of the orthogonal signal generation unit 57A can be simplified.

In the second embodiment as described above, the similar effects as those of the first embodiment can be obtained.

Although the laser interferometer according to an aspect of the present disclosure has been described above based on the embodiments described above, the laser interferometer according to an aspect of the present disclosure is not limited to the embodiments described above. A configuration of each part can be replaced with a configuration having the similar function. In addition, any other components may be added to the laser interferometer according to the embodiments described above. Further, the laser interferometer according to an aspect of the present disclosure may include two of the embodiments described above. Each functional unit provided in the laser interferometer according to an aspect of the present disclosure may be divided into a plurality of elements, or a plurality of functional units may be integrated into one.

The laser interferometer according to an aspect of the present disclosure can be applied to, for example, a vibration meter, an inclinometer, a distance meter (a length measuring device), and the like, in addition to the displacement meter or the speedometer described above. Examples of an application of the laser interferometer according to an aspect of the present disclosure include an optical fiber gyro that implements an optical comb interference measurement technique, an angular speed sensor, an angular acceleration sensor, and the like that are capable of performing distance measurement, 3D imaging, spectroscopy, and the like.

Two or more of the laser light source, the optical modulator, and the light receiving element may be mounted on the same substrate. As a result, a size and a weight of the optical system can be easily reduced, and it is easy to perform assembling.

Although a so-called Michelson interference optical system is provided in the embodiments described above, the laser interferometer according to an aspect of the present disclosure can also be applied to an interference optical system of another type such as a Mach-Zehnder interference optical system.

What is claimed is:

1. A laser interferometer comprising:
   a laser light source configured to emit first laser light;
   an optical modulator that includes a resonator element and is configured to modulate the first laser light using the resonator element and generate second laser light including a modulation signal;
   a light receiving element configured to receive the second laser light and third laser light including a sample signal generated by an object to be measured reflecting the first laser light and output a light reception signal; and
   a calculation unit configured to calculate a displacement of the object to be measured from the light reception signal based on a reference signal, wherein
   the calculation unit includes
      a preprocessing unit configured to execute a preprocessing of extracting a frequency modulation component from the light reception signal and output a preprocessing signal,
      a demodulation processing unit configured to mix the preprocessing signal with orthogonal signals to obtain a mixed signal and then execute a demodulation processing of extracting the sample signal from the mixed signal, and
      an orthogonal signal generation unit configured to generate the orthogonal signals based on a phase of the reference signal and an amplitude of the preprocessing signal, or based on the phase of the reference signal and an amplitude of the mixed signal.

2. The laser interferometer according to claim 1, wherein the orthogonal signal generation unit includes a phase amount setting unit configured to set phases of the orthogonal signals based on the amplitude of the preprocessing signal or the amplitude of the mixed signal.

3. The laser interferometer according to claim 2, wherein the phase amount setting unit sets the phases of the orthogonal signals such that a difference between a maximum value of the amplitude of the preprocessing signal and a minimum value of the amplitude of the preprocessing signal or a difference between a maximum value of the amplitude of the mixed signal and a minimum value of the amplitude of the mixed signal is equal to or less than a predetermined value.

4. The laser interferometer according to claim 1, wherein the orthogonal signal generation unit includes
   a Hilbert transform filter configured to perform a Hilbert transform processing on the reference signal to obtain a signal i,
   a reference signal delay device configured to delay the reference signal to obtain a signal r, and
   a reference signal phase calculator configured to perform an arctangent calculation on a ratio of the signal i to the signal r to obtain a phase of the reference signal.

5. The laser interferometer according to claim 2, wherein the orthogonal signal generation unit includes
   a Hilbert transform filter configured to perform a Hilbert transform processing on the reference signal to obtain a signal i,
   a reference signal delay device configured to delay the reference signal to obtain a signal r, and
   a reference signal phase calculator configured to perform an arctangent calculation on a ratio of the signal i to the signal r to obtain a phase of the reference signal.

6. The laser interferometer according to claim 3, wherein the orthogonal signal generation unit includes
   a Hilbert transform filter configured to perform a Hilbert transform processing on the reference signal to obtain a signal i,
   a reference signal delay device configured to delay the reference signal to obtain a signal r, and
   a reference signal phase calculator configured to perform an arctangent calculation on a ratio of the signal i to the signal r to obtain a phase of the reference signal.

7. The laser interferometer according to claim 1, wherein the demodulation processing unit includes a mixed signal amplitude calculator configured to obtain an amplitude of the mixed signal.

8. The laser interferometer according to claim 6, wherein the demodulation processing unit includes a mixed signal amplitude calculator configured to obtain an amplitude of the mixed signal.

9. The laser interferometer according to claim 1, further comprising:
an oscillation circuit configured to output the reference signal, wherein
the resonator element is a signal source of the oscillation circuit.

10. The laser interferometer according to claim 2, further comprising:
an oscillation circuit configured to output the reference signal, wherein
the resonator element is a signal source of the oscillation circuit.

11. The laser interferometer according to claim 3, further comprising:
an oscillation circuit configured to output the reference signal, wherein
the resonator element is a signal source of the oscillation circuit.

12. The laser interferometer according to claim 4, further comprising:
an oscillation circuit configured to output the reference signal, wherein
the resonator element is a signal source of the oscillation circuit.

13. The laser interferometer according to claim 5, further comprising:
an oscillation circuit configured to output the reference signal, wherein
the resonator element is a signal source of the oscillation circuit.

14. The laser interferometer according to claim 6, further comprising:
an oscillation circuit configured to output the reference signal, wherein
the resonator element is a signal source of the oscillation circuit.

15. The laser interferometer according to claim 7, further comprising:
an oscillation circuit configured to output the reference signal, wherein
the resonator element is a signal source of the oscillation circuit.

16. The laser interferometer according to claim 8, further comprising:
an oscillation circuit configured to output the reference signal, wherein
the resonator element is a signal source of the oscillation circuit.

17. The laser interferometer according to claim 9, wherein the resonator element is a quartz crystal resonator.

18. The laser interferometer according to claim 16, wherein the resonator element is a quartz crystal resonator.

* * * * *